United States Patent
Teraoka et al.

(10) Patent No.: US 11,009,451 B2
(45) Date of Patent: May 18, 2021

(54) MULTI-ANGLE COLORIMETER

(71) Applicant: KONICA MINOLTA, INC., Chiyoda-ku (JP)

(72) Inventors: Yoshitaka Teraoka, Suita (JP); Tomomi Setoguchi, Chigasaki (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/764,455

(22) PCT Filed: Sep. 11, 2018

(86) PCT No.: PCT/JP2018/033655
§ 371 (c)(1),
(2) Date: May 15, 2020

(87) PCT Pub. No.: WO2019/097826
PCT Pub. Date: May 23, 2019

(65) Prior Publication Data
US 2020/0363319 A1    Nov. 19, 2020

(30) Foreign Application Priority Data

Nov. 16, 2017  (JP) .............................. JP2017-221020

(51) Int. Cl.
*G01J 3/46*    (2006.01)
*G01N 21/25*    (2006.01)

(52) U.S. Cl.
CPC ..... *G01N 21/251* (2013.01); *G01N 2201/061* (2013.01); *G01N 2201/0633* (2013.01); *G01N 2201/0636* (2013.01)

(58) Field of Classification Search
CPC ...... G01J 3/50; G01J 3/46; G01J 3/524; G01J 3/02; G01N 21/474
USPC .......................................................... 356/425
See application file for complete search history.

(56) References Cited

U.S. PATENT DOCUMENTS

| | | | | |
|---|---|---|---|---|
| 5,096,298 | A | * | 3/1992 | Isobe ..................... G01N 21/41 356/369 |
| 2014/0152990 | A1 | | 6/2014 | Ehbets et al. |
| 2015/0085389 | A1 | * | 3/2015 | Axel ..................... B82Y 20/00 359/838 |

FOREIGN PATENT DOCUMENTS

| | | |
|---|---|---|
| JP | 2003-279413 | 10/2003 |
| JP | 2003-294530 | 10/2003 |
| JP | 2008-122335 | 5/2008 |
| JP | 4152786 | 9/2008 |
| JP | 2017-41796 | 2/2017 |
| WO | WO 2008/156147 | 12/2008 |
| WO | WO 2017/188085 | 11/2017 |

* cited by examiner

*Primary Examiner* — Md M Rahman
(74) *Attorney, Agent, or Firm* — Cozen O'Connor

(57) ABSTRACT

A multi-angle colorimeter includes an index calculation unit that calculates, based on a predetermined calculation formula, an index corresponding to a particle diameter of a glittering material, which is used for metallic coating or pearl coating, using optical parameters used in color evaluation of the metallic coating or pearl coating on a surface of an object.

17 Claims, 8 Drawing Sheets

MULTI-ANGLE COLORIMETER

RELATED APPLICATIONS

This is a U.S. National Phase Application under 35 USC 371 of International Application PCT/JP2018/033,655 filed on Sep. 11, 2018.

This application claims the priority of Japanese application no. 2017-221020 filed Nov. 16, 2017, the entire content of which is hereby incorporated by reference.

TECHNICAL FIELD

The present invention relates to a multi-angle colorimeter.

BACKGROUND ART

In recent years, in the field of industrial products such as vehicles, metallic coating or pearl coating (hereinafter, collectively referred to as "metallic/pearl coating" or "metallic/pearl color coating") is known as a method of realizing higher designability. In metallic/pearl color coating, the appearance of colors can be made different depending on the angle at which the coated surface is observed, due to the effect of the glittering material (flake-like aluminum pieces or mica pieces) contained in the coating.

As described above, in the metallic/pearl color coating, since the appearance of the color differs depending on the observation angle with respect to the coated surface, it is necessary to perform color evaluation for each of a plurality of observation angles. Therefore, a multi-angle colorimeter is generally used for color evaluation of metallic/pearl color coating. The multi-angle colorimeter illuminates the coated surface and receives reflected light (visible light) from the coated surface at a plurality of angles, so that the spectral reflectance of the reflected light can be measured at each angle. Further, based on the measured spectral reflectances, for example, tristimulus values XYZ in an XYZ color system, and brightness (L*) and a* and b* values in an L*a*b* color system are obtained. Therefore, it is possible to evaluate the color for each of a plurality of observation angles based on these optical parameters.

Here, to evaluate the metallic/pearl color coating, characteristics other than the color such as a graininess of the glittering material is needed to be evaluated as its texture, in addition to the above-described color evaluation. In this regard, for example, in Patent Literature 1, a digital camera measures a surface of an object to which metallic coating has been applied from a direction of a highlight of 15° (a direction in which a deflection angle with respect to a specular reflection direction of illumination light is 15°), and evaluates its texture by obtaining a value (HG value) representing a graininess of the glittering material using an image analysis.

CITATION LIST

Patent Literature

Patent Literature 1: JP 2003-279413 A (see [0008], [0045] to [0061], FIG. 1, FIG. 9, etc.)

SUMMARY OF INVENTION

Technical Problem

However, in a case where the texture evaluation of metallic/pearl color coating (especially the evaluation of graininess) is performed using a digital camera as described in Patent Literature 1, and the color evaluation is performed using a multi-angle colorimeter as described above and the texture evaluation is performed using a device (digital camera) different from the multi-angle colorimeter. In this manner, performing the color evaluation and the texture evaluation using different apparatuses causes an increase in size and cost of the entire apparatus used for evaluating the metallic/pearl color coating.

The present invention has been made in order to solve the above-described problems, and has an object to provide a multi-angle colorimeter capable of avoiding an increase in size and cost of an entire device that evaluates metallic coating or pearl coating, including color evaluation and texture evaluation (especially, evaluation of graininess).

Solution to Problem

A multi-angle colorimeter according to one aspect of the present invention includes a light emitting unit that emits light onto an object, a light amount detection unit that receives the light emitted from the light emitting unit and reflected by the object in a plurality of directions of angles, and detects a reflected light amount in each of the angle, and an index calculation unit that obtains optical parameters, which are used in color evaluation of metallic coating or pearl coating on a surface of the object, based on the reflected light amount, and calculates, using the optical parameters, an index corresponding to a particle diameter of a glittering material used in the metallic coating or the pearl coating, in which the index calculation unit calculates index B expressed by a following equation as the index corresponding to the particle diameter of the glittering material, when n is an integer equal to or greater than 2, the plurality of angles are $\theta_1$ to $\theta_n$ respectively, the optical parameters obtained for the respective angles $\theta_1$ to $\theta_n$ based on the reflected light amount are $I(\theta_1)$ to $I(\theta_n)$ respectively, and weighting coefficients of the respective optical parameters $I(\theta_1)$ to $I(\theta_n)$ are two types of $a_1$ to $a_n$ and $b_1$ to $b_n$ respectively, $$B = \{a_1 \cdot I(\theta_1) + a_2 \cdot I(\theta_2) + \ldots + a_n \cdot I(\theta_n)\} / \{b_1 \cdot I(\theta_1) + b_2 \cdot I(\theta_2) + \ldots + b_n \cdot I(\theta_n)\}$$

where regarding the weighting coefficients $a_1$ to $a_n$, one is positive, another is negative, and rest is positive, negative or zero, and each of the weighting coefficients $b_1$ to $b_n$ is positive, negative or zero, except a case where all are zero.

A multi-angle colorimeter according to another aspect of the present invention includes a light emitting unit that emits light onto an object, a light amount detection unit that receives the light emitted from the light emitting unit and reflected by the object in a plurality of directions of angles, and detects a reflected light amount in each of the angle, and an index calculation unit that obtains optical parameters, which are used in color evaluation of metallic coating or pearl coating on a surface of the object, based on the reflected light amount, and calculates, using the optical parameters, an index corresponding to a particle diameter of a glittering material used in the metallic coating or the pearl coating, in which the index calculation unit calculates index B expressed by a following equation as the index corresponding to the particle diameter of the glittering material, when n and m are respectively an integer equal to or greater than 2, the plurality of angles are $\theta_1$ to $\theta_n$ respectively, the optical parameters obtained for the respective angles $\theta_1$ to $\theta_n$ based on the reflected light amount for each different wavelength band or each different wavelength are $I'_1(\theta_1)$ to $I'_1(\theta_n), I'_2(\theta_1)$ to $I'_2(\theta_n), \ldots, I'_m(\theta_1)$ to $I'_m(\theta_n)$ respectively, and weighting coefficients of the respective optical parameters $I'_1(\theta_1)$ to $I'_1(\theta_n), I'_2(\theta_1)$ to $I'_2(\theta_n), \ldots, I'_m(\theta_1)$ to $I'_m(\theta_n)$ are two types of $a_1$ to $a_n$ and $b_1$ to $b_n$ respectively, $$B'_1 = \{a_1 \cdot I'_1(\theta_1) + a_2 \cdot I'_1(\theta_2) + \ldots + a_n \cdot I'_1(\theta_n)\} / \{b_1 \cdot I'_1(\theta_1) + b_2 \cdot I'_1(\theta_2) + \ldots + b_n \cdot I'_1(\theta_n)\}$$

$$B'_2 = \{a_1 \cdot I'_2(\theta_1) + a_2 \cdot I'_2(\theta_2) + \ldots + a_n \cdot I'_2(\theta_n)\} / \{b_1 \cdot I'_2(\theta_1) + b_2 \cdot I'_2(\theta_2) + \ldots + b_n \cdot I'_2(\theta_n)\}$$

$$\ldots$$

$$B'_m = \{a_1 \cdot I'_m(\theta_1) + a_2 \cdot I'_m(\theta_2) + \ldots + a_n \cdot I'_m(\theta_n)\} / \{b_1 \cdot I'_m(\theta_1) + b_2 \cdot I'_m(\theta_2) + \ldots + b_n \cdot I'_m(\theta_n)\}$$

$$B = B'_1 + B'_2 + \ldots + B'_m$$

where regarding the weighting coefficients $a_1$ to $a_n$, one is positive, another is negative, and rest is positive, negative, or zero, and the respective weighting coefficients $b_1$ to $b_n$ are positive, negative, or zero, except a case where all are zero.

A multi-angle colorimeter according to still another aspect of the present invention includes a light emitting unit that emits light onto an object, a light amount detection unit that receives the light emitted from the light emitting unit and reflected by the object in a plurality of directions of angles, and detects a reflected light amount in each of the angle, and an index calculation unit that obtains optical parameters, which are used in color evaluation of metallic coating or pearl coating on a surface of the object, based on the reflected light amount, then sums the optical parameters of at least two or more angles, and obtains a summed value as an index corresponding to a particle diameter of a glittering material used in the metallic coating or the pearl coating.

Advantageous Effects of Invention

According to the above configuration, using a multi-angle colorimeter used in color evaluation, texture evaluation based on the index B or the summed value calculated by the index calculation unit of the colorimeter (especially evaluation of graininess) can be performed. With this configuration, it is possible to avoid increase in size and cost of the entire device for evaluating the metallic coating or the pearl coating, including the color evaluation and the texture evaluation.

DESCRIPTION OF EMBODIMENTS

First Embodiment

One embodiment of the present invention will be described below with reference to the drawings. Note that, in this specification, when a numerical range is expressed as "a to b," the numerical range includes a lower limit a and an upper limit b. Further, the present invention is not limited to the following contents.

(1. Multi-Angle Colorimeter)

Figure 1:
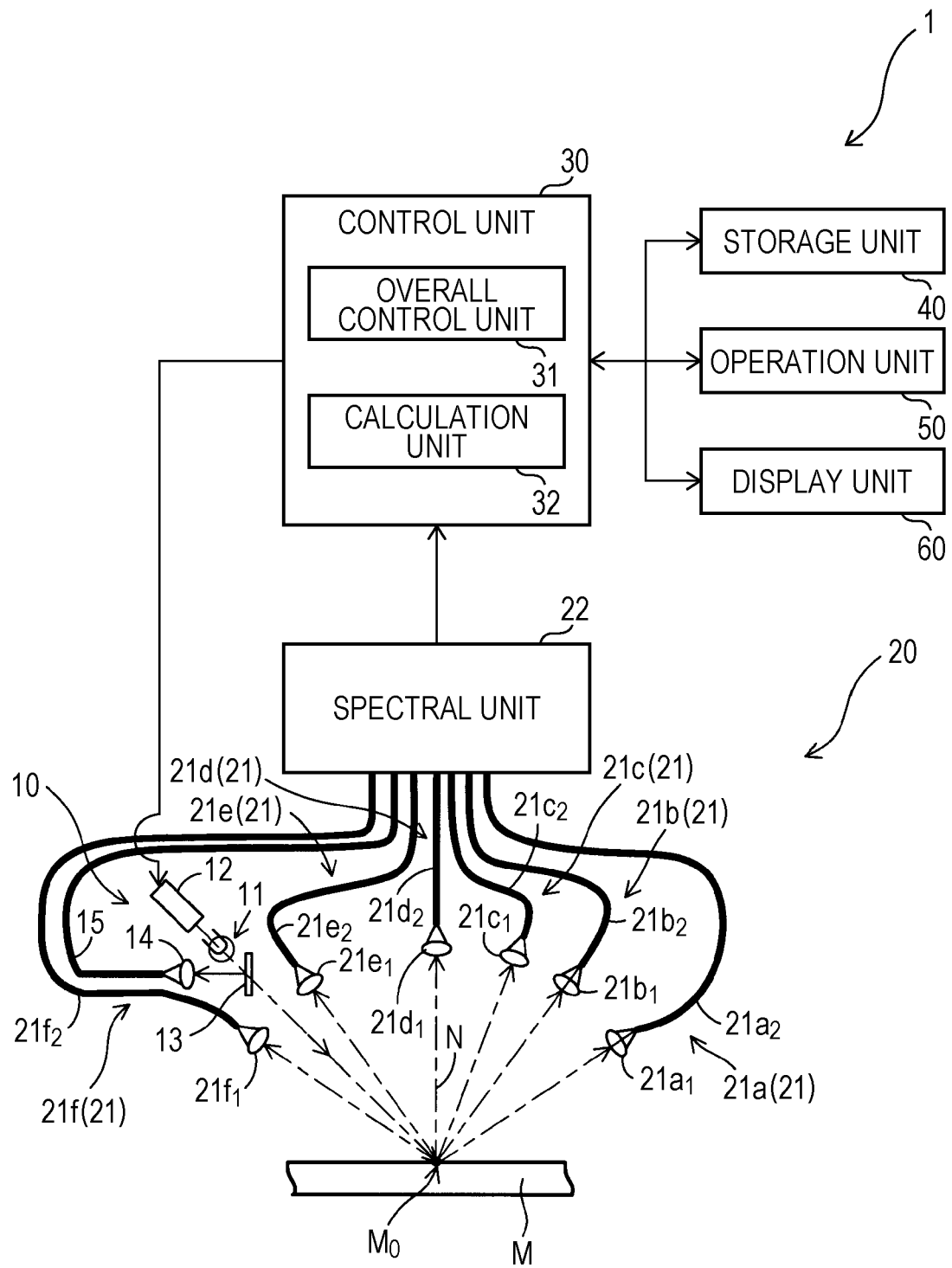
FIG. 1 is an explanatory diagram schematically illustrating an entire configuration of a multi-angle colorimeter according to a first embodiment of the present invention.

FIG. 1 is an explanatory diagram schematically illustrating the overall configuration of a multi-angle colorimeter 1 according to the present embodiment. The multi-angle colorimeter 1 is a device for performing color evaluation and texture evaluation of metallic coating or pearl coating applied to an object M, and includes a light emitting unit 10, a light amount detection unit 20, a control unit 30, a storage unit 40, an operation unit 50, and a display unit 60. Here, the object M refers to a vehicle body that has been subjected to metallic coating or pearl coating, or a coating sample (sample) of the vehicle body. The vehicle body includes a part of the vehicle body such as an exterior part (a fender, a door, and the like) in addition to a vehicle as a finished product.

(1-1. Light Emitting Unit)

The light emitting unit 10 is an illuminating unit that emits light to the object M and illuminates the object M and, according to the present embodiment, the light emitting unit 10 illuminates the object M from a direction of 45° with respect to a normal line N at a measurement point $M_0$ on the coated surface of the object M. Such a light emitting unit 10 includes a light source device 11, a light emitting circuit 12, a half mirror 13, a lens 14, and a light guide unit 15.

The light source device 11 includes a light source made of a xenon flash lamp for example, a regulating plate that regulates a light beam emitted from the light source, and a collimating lens that converts the light beam emitted from the light source and regulated by the regulating plate into parallel light. The light emitting circuit 12 is a circuit that causes the light source of the light source device 11 to emit light under the control of the control unit 30, and is provided near the light source device 11. The half mirror 13 reflects a part of the light emitted from the light source device 11 toward the lens 14 and transmits the remaining light (illumination light) toward the object M. The lens 14 transmits the light reflected by the half mirror 13 among the light emitted from the light source device 11 and collects the light on one end face of the light guide unit 15. The light guide unit 15 is made of, for example, an optical fiber, and internally guides light incident on one end face via the lens 14 and guides the light to a later-described spectral unit 22 of the light amount detection unit 20.

(1-2. Light Amount Detection Unit)

The light amount detection unit 20 is a unit that receives light emitted from the light emitting unit 10 and reflected by the object M in a plurality of angular directions, respectively, and detects the reflected light amount at each of the plurality of angles. The light amount detection unit 20 has a plurality of light receiving units 21 and the spectral unit 22.

According to the present embodiment, the plurality of light receiving units 21 are composed of six light receiving units 21a to 21f. Note that the number of the light receiving units 21 may be any plural number, and is not limited to the above six. The light receiving units 21a to 21f includes lenses $21a_1$ to $21f_1$ and light guide units $21a_2$ to $21f_2$ respectively. The lenses $21a_1$ to $21f_1$ transmit the light emitted from the light emitting unit 10 (the light source device 11) and reflected on the surface of the object M in a plurality of angular directions, and collects the lights to one end faces of the light guide units $21a_2$ to $21f_2$. Each of the light guide units $21a_2$ to $21f_2$ is made of, for example, an optical fiber, and internally guides light incident on one end face through the lenses $21a_1$ to $21f_1$, and guides the light to the spectral unit 22. The other end surfaces of the light guide unit 15 and the light guide units $21a_2$ to $21f_2$ are supported by a housing 22a of the spectral unit 22 (see FIG. 2).

Here, the principal light beam of the light emitted from the light emitting unit 10 (center ray of the light flux) in a plane including the incident direction and the specular reflection direction with respect to the object M (measurement point $M_0$) (in a plane parallel to the paper face of FIG. 1), the specular reflection direction is 0°, and the measurement point $M_0$ is used as a reference (fulcrum), and the angle direction that tilts (rotates) from the specular reflection direction toward the incident direction is considered to be a positive direction. According to the present embodiment, as the plurality of angles (directions), for example, −15°, +15°, +25°, +45°, +75°, and +110° are considered. Note that, in the following, the angles of +15°, +25°, +45°, +75°, and +110° are also expressed as 15°, 25°, 45°, 75° and 110° simply by omitting the positive signs (+). Note that the plurality of angles are not limited to the above angles.

Note that the angle θ based on the specular reflection direction is also referred to as Asθ. As is an abbreviation of aspecular, and indicates a deviation from the direction of specular reflection. Therefore, the multiple angles described above can also be expressed as As(−15°), As(15°), As(25°), As(45°), As(75°), and As(110°).

Figure 2:
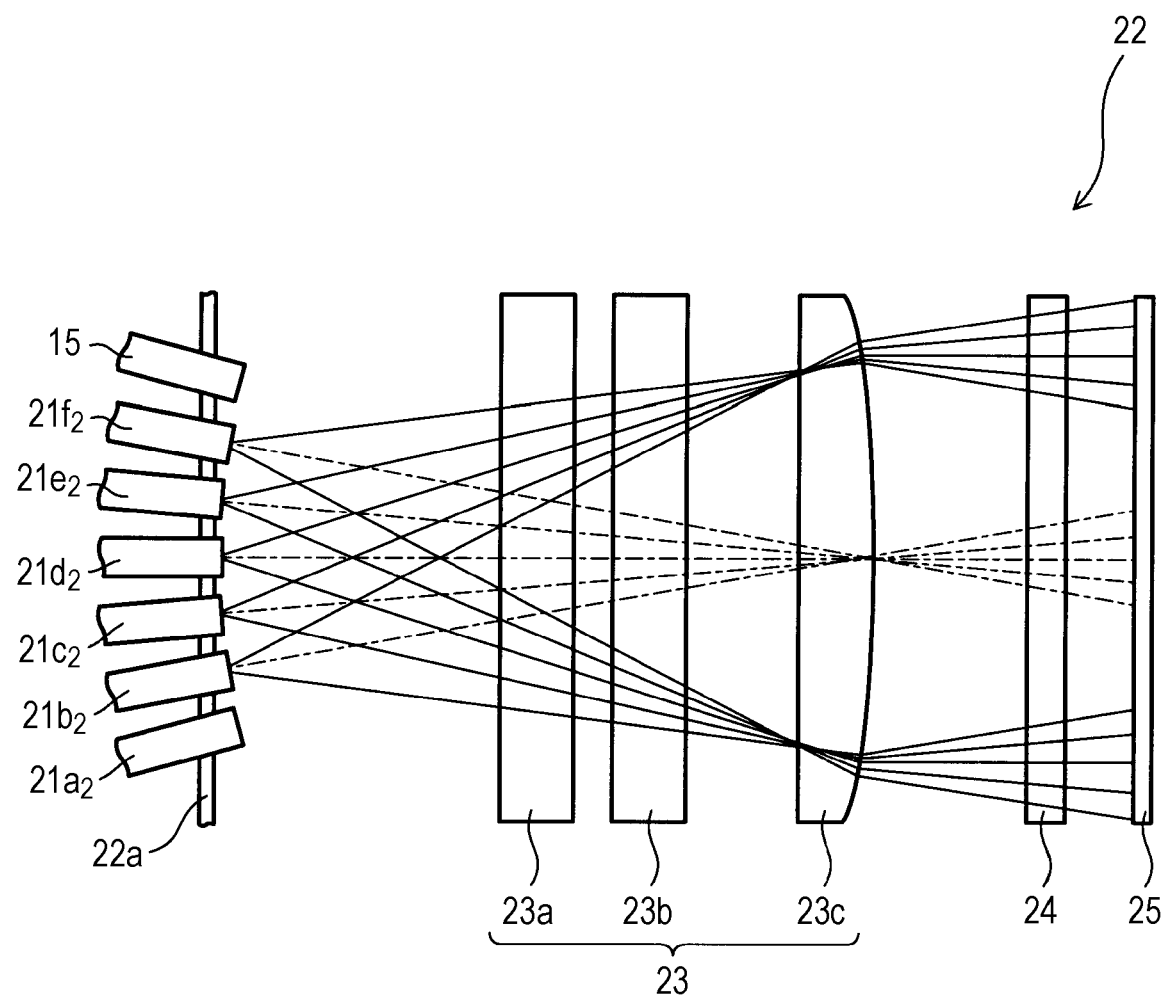
FIG. 2 is a cross-sectional diagram schematically illustrating a schematic configuration of a spectral unit of the multi-angle colorimeter.

The spectral unit 22 splits the light incident through each of the light receiving units 21a to 21f (particularly, the light guide units $21a_2$ to $21f_2$), detects the reflected light amount (light reception amount) at each of the plurality of angles and detects the received amount of light entered through the light guide unit 15 of the light emitting unit 10. FIG. 2 is a cross-sectional diagram schematically illustrating a schematic configuration of the spectral unit 22. Note that, in FIG. 2, optical paths of light emitted from other end surfaces of the five light guide units $21b_2$ to $21f_2$ among the light guide unit 15 and the light guide units $21a_2$ to $21f_2$ are representatively illustrated. The spectral unit 22 includes a condensing optical system 23, a spectral section 24, and a light detection unit 25.

The condensing optical system 23 includes, for example, a plurality of cylindrical lenses 23a to 23c, and shapes the incident light into a linear light flux extending in one direction (the direction of arrangement of the light guide unit 15 and the light guide units $21a_2$ to $21f_2$ in FIG. 2). The spectral section 24 includes, for example, a linear variable filter (LVF) or a split filter. The LVF is a filter that varies the wavelength of transmitted light according to the incident position of light in one direction (also referred to as a wavelength change direction). The split filter is a filter configured by arranging a large number of filters having mutually different wavelengths of transmitted light in the one direction.

The light detection unit 25 includes a plurality of photoelectric conversion elements that generate and output an electric signal corresponding to the wavelength of light transmitted through the spectral section 24 or the intensity of each wavelength range. As the photoelectric conversion element, for example, an optical sensor such as a charge coupled device (CCD) can be used. The plurality of photoelectric conversion elements are arranged at mutually different positions in the one direction in which the wavelength of the light transmitted through the spectral section 24 changes, thereby forming a line sensor.

In the spectral unit 22 having the above configuration, the light emitted from the other end surfaces of the light guide units $21a_2$ to $21f_2$ is shaped into a linear light flux in the one direction by the condensing optical system 23, then split in one direction by the spectral section 24, and is incident on the light detection unit 25. The light detection unit 25 detects the light reception amount according to the wavelength of the incident light for each of the light guide units $21a_2$ to $21f_2$, which is each of a plurality of angles that are reflection directions on the object M. The electric signal corresponding to the light reception amount is output to the control unit 30. Further, based on the similar principle, with respect to light incident through the light guide unit 15 of the light emitting unit 10, the light reception amount is detected by the light detection unit 25, and an electric signal corresponding to the received light amount is output to the control unit 30.

In the spectral unit 22, a shutter may be provided near the other end surfaces of the light guide unit 15 and the light guide units $21a_2$ to $21f_2$, and transmission/blocking of the light emitted from each light guide unit may be respectively controlled by turning each shutter ON/OFF.

(1-3. Control Unit)

Returning to FIG. 1, the description will be continued. The control unit 30 includes, for example, a central processing unit (CPU), and operates based on an operation program stored in the storage unit 40. Such a control unit 30 includes an overall control unit 31 and a calculation unit 32.

The overall control unit 31 controls the operation of each unit of the multi-angle colorimeter 1. Further, the overall control unit 31 controls the light emitting circuit 12 of the light source based on the amount of light received from the light guide unit 15 of the light amount detection unit 20 and detected by the light detection unit 25. This allows the light source to emit light with an appropriate amount of light for each of the objects M to be measured, thereby illuminating the object M.

The calculation unit 32 performs various calculations based on the electric signal output from the light amount detection unit 20. For example, the calculation unit 32 acquires the optical parameters used for the color evaluation of the metallic coating or the pearl coating on the surface of the object M, based on the reflected light amount detected by the light amount detection unit 20, which is expressed by the electric signal, and at the same time, acquires the optical parameters for each of a plurality of angles that are reflection directions on the object M. Therefore, when the optical parameters are displayed on the display unit 60 for each of the angles, the user viewing the display unit 60 looks at the displayed optical parameters and performs color evaluation of the surface of the object M at each of the angles.

Here, as the optical parameters, for example, there are spectral reflectances, tristimulus values XYZ in an XYZ color system, brightness L* in an L*a*b* color system and a chromaticness index (a* value and b* value).

The spectral reflectance is expressed with a value (%) obtained by multiplying the ratio of the amount of light reflected by the object M to the reflected light amount (which is assumed to be known) of reflecting light on the perfect diffuse reflection surface by 100, for each wavelength. In a case where the optical parameters are the spectral reflectances, for example, the color or shading of the coating applied to the surface of the object M can be evaluated based on the spectral reflectances.

The tristimulus values XYZ in the XYZ color system is calculated by the following Equation 1 or Equation 2. Equation 1 shows a calculation formula of tristimulus values XYZ in a three-color color system (also referred to as a 2° visual field XYZ color system) based on a color-matching function adopted in 1931 by the International Commission on Illumination (CIE). Equation 2 shows a calculation formula of tristimulus values $X_{10}Y_{10}Z_{10}$ in the three-color color system (also referred to as a 10° visual field XYZ color system) based on a color-matching function adopted in 1964 by CIE. Note that, here, the tristimulus values XYZ of Expression 1 and the tristimulus value $X_{10}Y_{10}Z_{10}$ of Expression 2 are collectively referred to as tristimulus values XYZ. In a case where the optical parameters are tristimulus values XYZ, using those stimulus values, brightness (Y value, luminance value), chromaticity x (=X/(X+Y+Z)) and y (=Y/(X+Y+Z)) can be evaluated.

$$XYZ \ (CIE \ 1931{:}2° \ \text{visual field}) \quad [\text{Equation 1}]$$
$$X = K\sum S(\lambda)\bar{x}(\lambda)R(\lambda)$$
$$Y = K\sum S(\lambda)\bar{y}(\lambda)R(\lambda)$$
$$Z = K\sum S(\lambda)\bar{z}(\lambda)R(\lambda)$$
$$K = \frac{100}{\sum S(\lambda)\bar{y}(\lambda)}$$

where $\lambda$: wavelength (nm)

$S(\lambda)$: value at wavelength $\lambda$ of relative spectral distribution of color-measuring standard light source $\bar{x}(\lambda), \bar{y}(\lambda), \bar{z}(\lambda)$: color matching functions of XYZ color system (CIE 1931)

$R(\lambda)$: spectral solid angle reflectance of sample $$X_{10}Y_{10}Z_{10} \ (CIE \ 1964{:}10° \ \text{visual field}) \quad [\text{Equation 2}]$$
$$X_{10} = K\sum S(\lambda)\bar{x}_{10}(\lambda)R(\lambda)$$
$$Y_{10} = K\sum S(\lambda)\bar{y}_{10}(\lambda)R(\lambda)$$
$$Z_{10} = K\sum S(\lambda)\bar{z}_{10}(\lambda)R(\lambda)$$
$$K = \frac{100}{\sum S(\lambda)\bar{y}_{10}(\lambda)}$$

where $\lambda$: wavelength (nm)

$S(\lambda)$: value at wavelength $\lambda$ of relative spectral distribution of color-measuring standard light source $\bar{x}_{10}(\lambda), \bar{y}_{10}(\lambda), \bar{z}_{10}(\lambda)$: color matching functions of $X_{10}Y_{10}Z_{10}$ color system (CIE 1964)

$R(\lambda)$: spectral solid angle reflectance of sample

The brightness L* in the L*a*b* color system is calculated by following Equation 3. The chromaticness index (a* value and b* value) is calculated by following Equation 4. Since hue and saturation can be determined from the a* value and the b* value, the brightness, hue, and saturation can be evaluated in a case where the optical parameters are L*, a* value, and b* value. Note that, in a case where X/Xn, Y/Yn, and Z/Zn in Expression 4 include $(24/116)^3 = 0.008856$ or less, the corresponding cubic root terms are respectively replaced by Expression 5 and calculated.

$$L^* = 116\left(\frac{Y}{Yn}\right)^{1/3} - 16 \quad \left(\text{when } \frac{Y}{Yn} > 0.008856\right) \quad [\text{Equation 3}]$$
$$L^* = 903.29\left(\frac{Y}{Yn}\right) \quad \left(\text{when } \frac{Y}{Yn} \leq 0.008856\right)$$

where

Y: Y (2° visiual field) or $Y_{10}$ (10° visual field) of tristimulus value in XYZ color system or $X_{10}Y_{10}Z_{10}$ color system of sample Yn: Y (2° visual field) or $Y_{10}$ (10° visual field) of tristimulus value in XYZ color system or $X_{10}Y_{10}Z_{10}$ color system of perfect diffuse reflection surface $$\text{when } \frac{X}{Xn} > 0.008856, \ \frac{Y}{Yn} > 0.008856, \ \frac{Z}{Zn} > 0.008856 \quad [\text{Equation 4}]$$
$$a^* = 500\left\{\left(\frac{X}{Xn}\right)^{1/3} - \left(\frac{Y}{Yn}\right)^{1/3}\right\}$$
$$b^* = 200\left\{\left(\frac{Y}{Yn}\right)^{1/3} - \left(\frac{Z}{Zn}\right)^{1/3}\right\}$$

where

X, Y, Z: tristimulus values in XYZ color system or $X_{10}Y_{10}Z_{10}$ color system of sample Xn, Yn, Zn: tristimulus values in XYZ color system or $X_{10}Y_{10}Z_{10}$ color system of perfect diffuse reflection surface $$7.787\left(\frac{X}{Xn}\right) + \frac{16}{116} \quad [\text{Equation 5}]$$
$$7.787\left(\frac{Y}{Yn}\right) + \frac{16}{116}$$
$$7.787\left(\frac{Z}{Zn}\right) + \frac{16}{116}$$

(1-4. Storage Unit, Operation Unit, and Display Unit)

The storage unit 40 is configured by, for example, a nonvolatile memory, and stores various data (detected values) output from the light amount detection unit 20 and the like in addition to the operation program of the control unit 30. The operation unit 50 is an input unit that receives various inputs by the user. When the operation unit 50 is operated by the user, a signal corresponding to the operation is sent to the control unit 30, and under the control of the control unit 30, various operations (for example, power ON/OFF, starting/stopping color measurement, and the like) are executed. The display unit 60 is a display for displaying various information. For example, the results calculated by the calculation unit 32, such as the optical parameters described above and the index B described later, are displayed on the display unit 60.

(2. Calculation of Index Corresponding to Particle Diameter of Glittering Material)

According to the present embodiment, the calculation unit 32 of the control unit 30 calculates an index corresponding to the particle diameter of a glittering material used in metallic coating or pearl coating, using the optical parameters used for color evaluation. In this case, the calculation unit 32 functions as an index calculation unit that calculates the index. Hereinafter, a method of calculating the index will be described.

Figure 3:
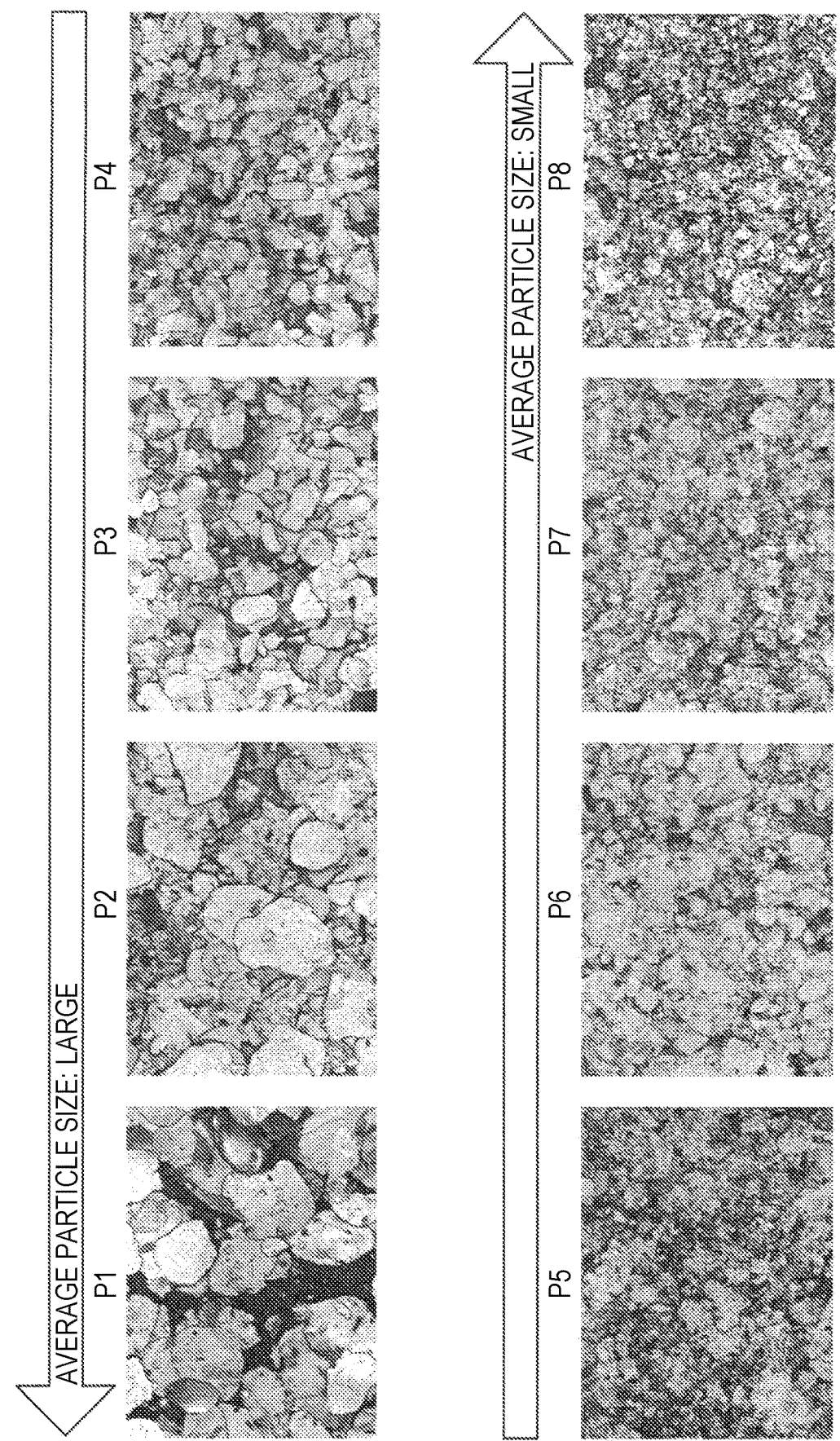
FIG. 3 is an explanatory diagram illustrating micrographs of a plurality of samples with different glittering material particle diameters.

FIG. 3 illustrates micrographs of samples P1 to P8 in which the particle diameter of the glittering material is different in a stepwise manner, arranged in descending order of the average particle diameter of the glittering material. The average particle diameter of the glittering material is about 80 μm in sample P1 (the largest of the samples P1 to P8), the average particle diameter of the glittering material decreases in order from sample P1 to sample P8, and the average particle diameter of the glittering material of the sample P8 is about 10 μm. Note that the photographing magnification of each micrograph is the same (50 times which is the magnification of the eyepiece×the magnification of the objective lens, in this example).

Here, for the sake of convenience in the following description, of the light incident and reflected on the surface of each sample, the light reflected at an angle close to the specular reflection direction (for example, As(−15°) to As(45°)) is referred to as highlight and the light reflected at an angle away from the specular reflection direction (for example, As(75°) to As(110°)) is referred to as shade.

With a smaller particle diameter of the glittering material (with finer particles of the glittering material), more incident light will penetrate into the sample and be reflected by the glittering material. This increases the probability that the incident light is reflected by the glittering material having an inclination and, when the incident light is reflected to the outside of the sample, the incident light is easily diffused in a direction away from the specular reflection. As a result, the component of the diffused light increases. Conversely, with a larger particle diameter of the glittering material (with coarser particles of the glittering material), there may be a higher probability that incident light is reflected by the glittering material near the sample surface, and a fewer chances of reflection by the glittering material inside the sample. Then, the incident light is likely to be reflected in a direction close to specular reflection when being reflected to the outside of the sample. As a result, an angular distribution of reflected light having directivity in the specular reflection direction is obtained.

In other words, when the particle diameter of the glittering material is small, the chance of light reflection inside increases and the diffusion component increases, so that the difference in the amount of reflected light received (reflected light amount) between the highlight and the shade decreases. Conversely, when the particle diameter of the glittering material is large, the chance of light reflection inside decreases, and the specular reflection component increases, so the difference in the amount of reflected light (reflected light amount) received between the highlight and the shade increases.

Therefore, when the glittering material is fine, the highlight component (light reception amount) of the reflected light is relatively low, and the shade component (light reception amount) is relatively high. Conversely, when the glittering material is coarse, the highlight component of the reflected light is relatively high and the shade component is relatively low.

Therefore, from the above, it is considered that the relative height relationship between the highlight component and the shade component of the reflected light, which does not depend on an absolute value, has a correlation with the particle diameter of the glittering material. Therefore, the size of the particle diameter of the glittering material can be determined based on the height relationship.

The basic concept of determining the size of the particle diameter of the glittering material is as described above, but the inventors of the present application have studied an equation to obtain a higher correlation between the optical parameters (for example, brightness L*) obtained at each of a plurality of angles and the particle diameter of the glittering material, and have set the obtained equation as an index calculation formula used in the calculation unit 32. The details are as follows.

Figure 4:
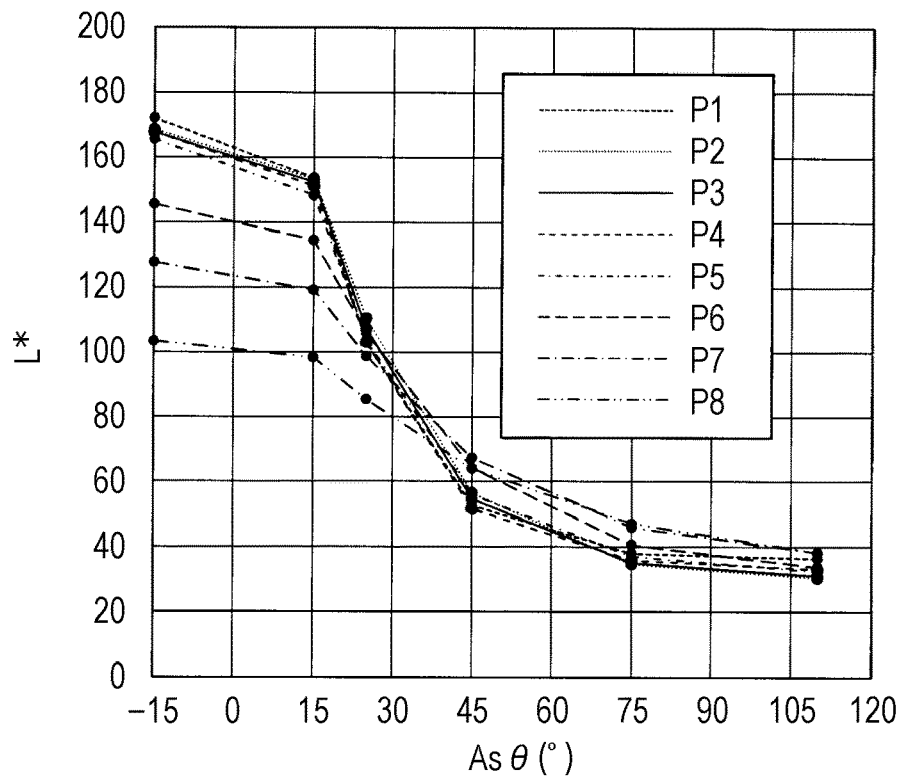
FIG. 4 is a graph illustrating a relationship between a plurality of angles and brightness L* for the plurality of samples.

FIG. 4 is a graph that illustrates relationship between a plurality of angles As(−15°), As(15°), As(25°), As(45°), As(75°), and As(110°) and the brightness L* of the L*a*b* color system for the above eight samples P1 to P8. As illustrated in the figure, for any of the samples P1 to P8, it is seen that the brightness L* is the highest at the angle As(−15°) and decreases as being closer to the angle As(110°), and the brightness L* becomes lowest at the angle As(110°).

Figure 5:
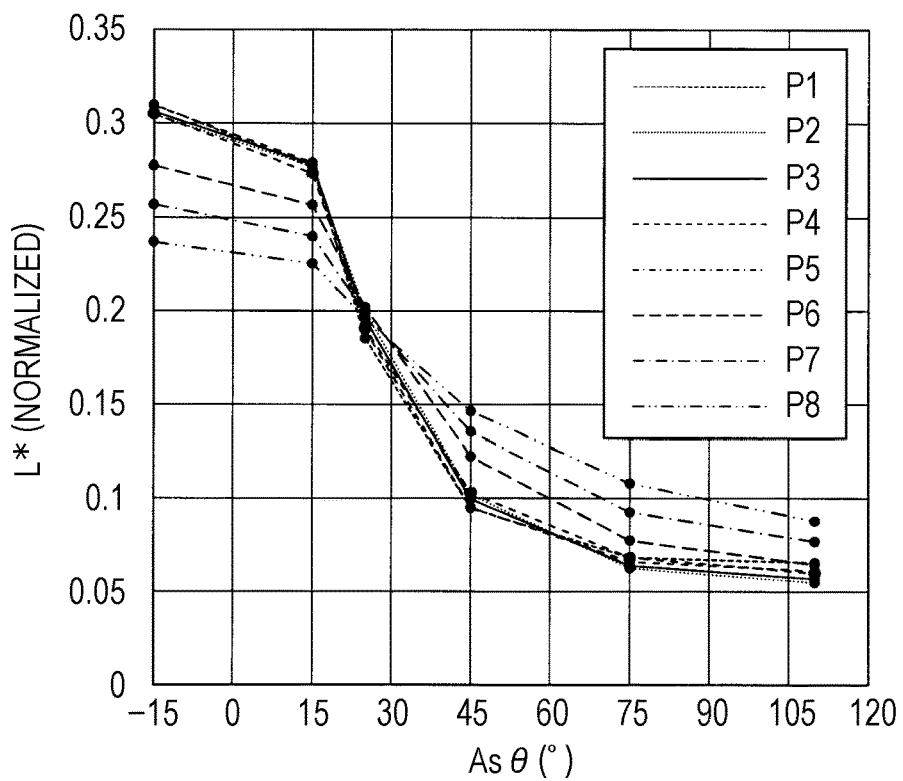
FIG. 5 is a graph obtained by normalizing the graph illustrated in FIG. 4 by a sum of the brightness L*.

FIG. 5 illustrates the graph in FIG. 4 normalized by the sum (area, integral value) of the brightness L* for each of the samples P1 to P8. By the normalization, the difference in the absolute value of the brightness L* between the samples P1 to P8 is canceled, and the difference in the relative distribution of the brightness L* depending on the size of the particle diameter appears remarkably.

Here, it is remarkable that, when focusing on the highlight (−15°≤Asθ≤45°), the larger the particle diameter of the glittering material (closer to the sample P1), the larger the gradient of the distribution of the brightness L*, and the smaller the particle diameter of the glittering material, (closer to the sample P8), the smaller the gradient of the distribution of the brightness L*. This means that there is a high correlation between the difference in brightness L* obtained for the two angles of highlight and the particle diameter of the glittering material. Therefore, for example, assuming that the index corresponding to the particle diameter of the glittering material is B1 or B2, by calculating the index B1 or B2 by any of the following equations, the size of the particle diameter of the glittering material can be evaluated based on the value of the index B1 or B2. Note that, in the following equations, L(θ) indicates the brightness L* obtained for an angle θ.

$$B1=\{(L(-15°)-L(25°)\}/\{(L(-15°)+L(15°)+L(25°)+L(45°)+L(75°)+L(110°)\} \quad (1)$$

$$B2=\{(L(15°)-L(25°)\}/\{L(-15°)+L(15°)+L(25°)+L(45°)+L(75°)+L(110°)\} \quad (2)$$

Next, the correlation between the index B1 obtained based on the above equation (1) and the particle diameter of the glittering material, and the correlation between the index B2 obtained based on the above equation (2), and the particle diameter of the glittering material will be studied.

Figure 6:
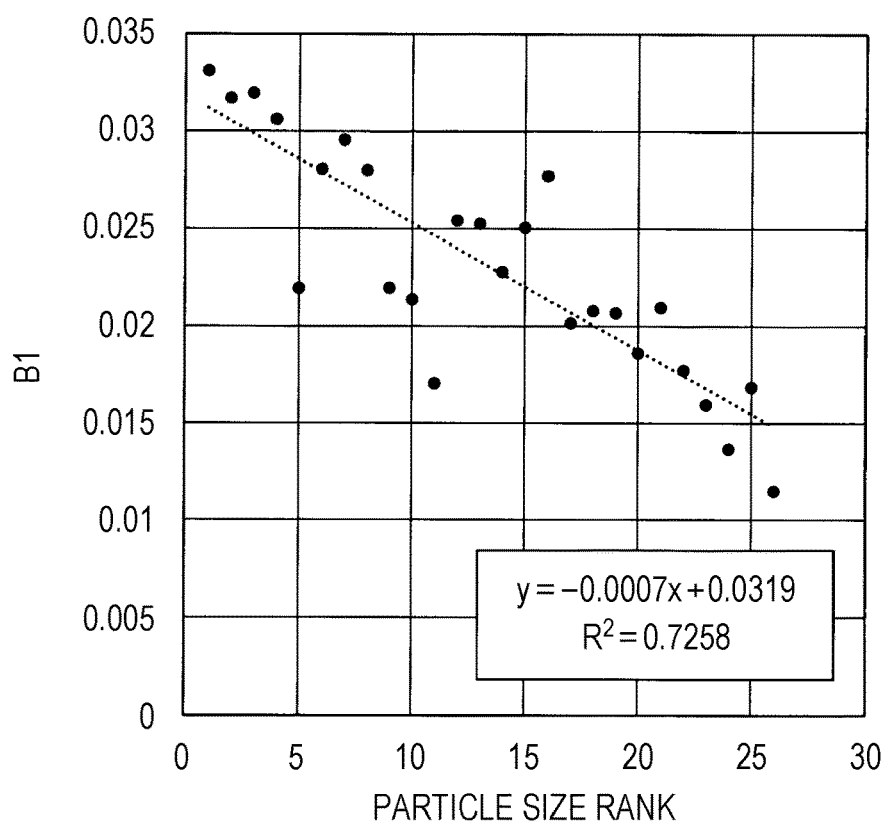
FIG. 6 is an explanatory diagram in which points determined by the particle diameter rank of the glittering material and values of an index corresponding to the particle diameter of the glittering material are plotted on a coordinate plane.
Figure 7:
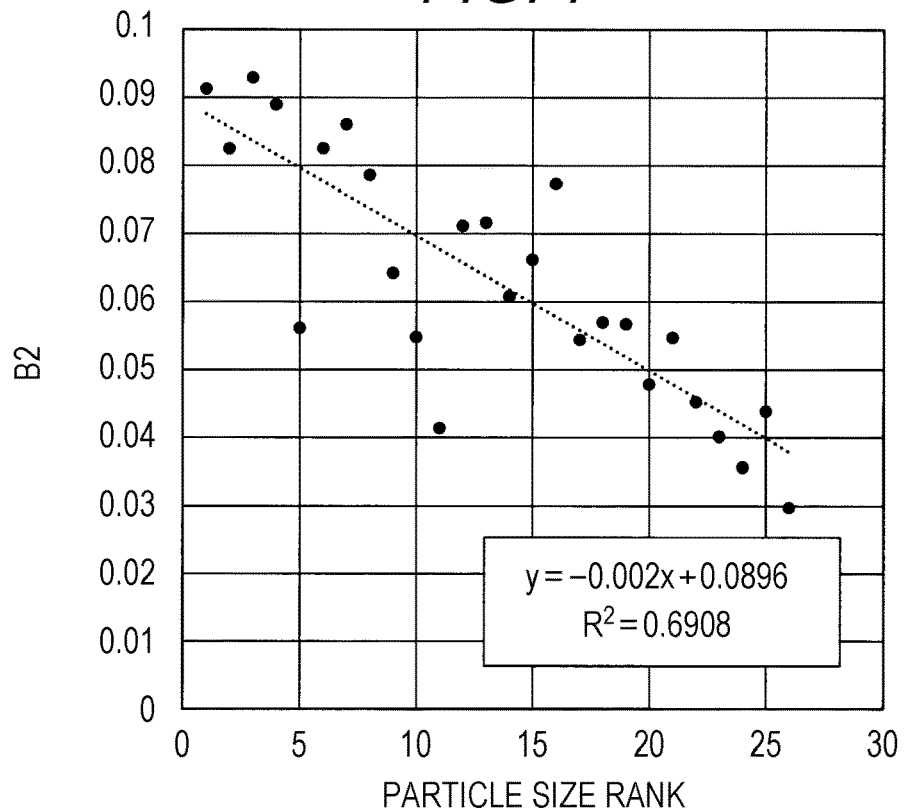
FIG. 7 is an explanatory diagram in which points determined by the particle diameter rank of the glittering material and values of another index corresponding to the particle diameter of the glittering material are plotted on a coordinate plane.

FIG. 6 is a plot of points determined the particle diameter rank of the glittering material and the value of the index B1 calculated using the equation (1) on a coordinate plane for a plurality of samples having different glittering material particle diameters. Note that, regarding the particle diameter ranks of the glittering materials, the smaller the value, the larger the particle diameter, and the larger the value, the smaller the particle diameter. When a regression line approximating the distribution of each point in the figure is obtained by the least-squares method, y=−0.0007x+0.0319 is obtained as the regression line, and $R^2$=0.7258 is obtained as the determination coefficient indicating the degree of correlation between the regression line and each point. Note that the determination coefficient $R^2$ is calculated by following Equation 6. In general, since it is considered that the correlation is high when the determination coefficient $R^2$ is equal to or greater than 0.5, it can be said that the correlation between the index B1 and the particle diameter of the glittering material is higher than the value of the determination coefficient $R^2$.

$$R^2 = \frac{\sum_{i=1}^{n}\{f(xi)-Y\}^2}{\sum_{i=1}^{n}(yi-Y)^2} = 1 - \frac{\sum_{i=1}^{n}\{yi-f(xi)\}^2}{\sum_{i=1}^{n}(yi-Y)^2} \quad \text{[Equation 6]}$$

where ($xi$, $yi$): coordinate data $Y$: $yi$ average $f(xi)$: value of $y$ in regression formula $y = f(x)$ when $x = xi$ FIG. 7 is a plot of points determined the particle diameter rank of the glittering material and the value of the index B2 calculated using the equation (2) on a coordinate plane for a plurality of samples having different glittering material particle diameters. Similarly to the above, when the regression line was obtained by the least-squares method, y=0.002x+0.0896 was obtained as the regression line, and $R^2$=0.6908 was obtained as the determination coefficient. Therefore, it can be said that the correlation between the index B2 and the particle diameter of the glittering material is high.

Further, it was found from the following study that there was a high correlation between each of the calculated index and the particle diameter of the glittering material when the numerators of the equations (1) and (2) include the difference of the brightness L* for the two angles, even if the brightness L* for the other angles is further added or subtracted from the numerator. For example, the index B3 may be calculated by the following equation (3).

$$B3=\{(L(-15°)-L(25°)+0.5L(75°)\}/\{(L(-15°)+L(15°)+L(25°)+L(45°)+L(75°)+L(110°)\} \quad (3)$$

Figure 8:
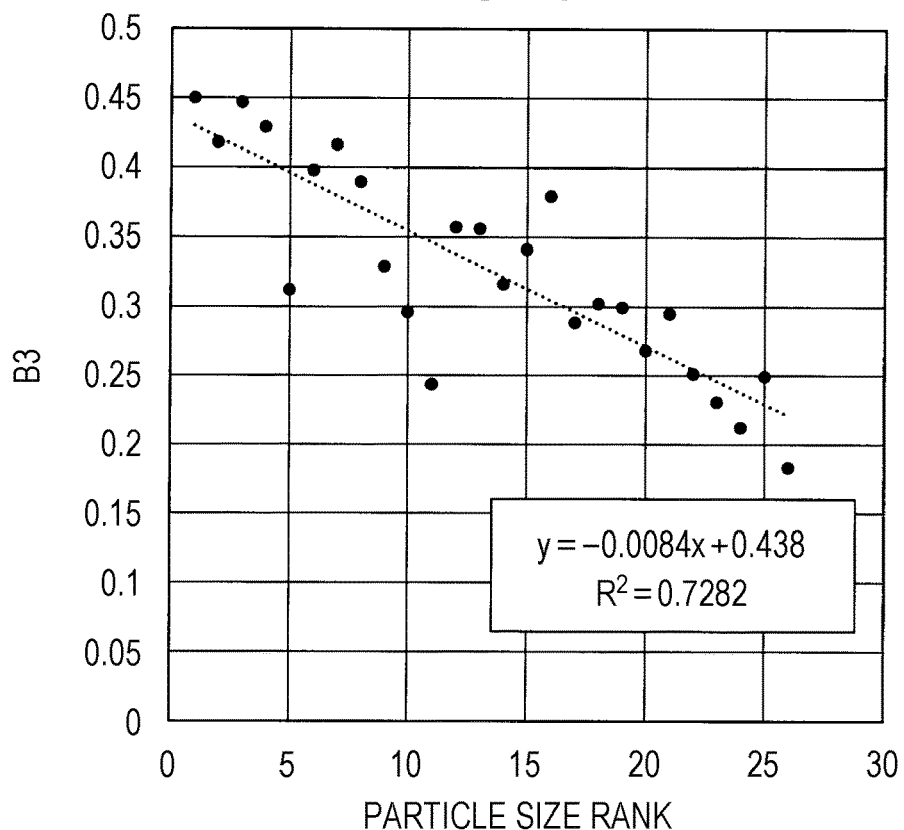
FIG. 8 is an explanatory diagram in which points determined by the particle diameter rank of the glittering material and values of still another index corresponding to the particle diameter of the glittering material are plotted on a coordinate plane.

FIG. 8 is a plot of points determined the particle diameter rank of the glittering material and the value of the index B3 calculated using the equation (3) on a coordinate plane for a plurality of samples having different glittering material particle diameters. When the regression line was determined by the least-squares method, y=−0.0084x+0.438 was obtained as the regression line, and $R^2$=0.7282 was obtained as the determination coefficient. Therefore, it can be said that the correlation between the index B3 and the particle diameter of the glittering material is high.

Although detailed verification is omitted, it has been found that there was a high correlation between each of the calculated indexes and the particle diameter of the glittering material even in a case where the numerators in the above equations (1) to (3) are the difference between the brightness L* for two shade angles (for example, (L(75°)−L(110°)) or the difference between the brightness L* for the highlight angle and the brightness L* for the shade angle (e.g. (L(−15°)−L(75°)).

Further, from the verification of the equation (3), the coefficient of L(θ) of the numerator of the calculation formula (also referred to as a weighting coefficient) may be any other coefficients in addition to +1 and −1 (see "0.5 L(75°)" in the numerator of the equation (3)), and it can be said that zero may be included as a coefficient (for example, in the numerator of the equation (3), the coefficients of L(25°), L(45°), and L(110°) can all be considered zero). Further, in the denominators of the equations (1) to (3), the coefficients of L(θ) are all "+1," and the denominator is a simple sum of L(θ); however, the coefficients of L(θ) in the denominators may include a positive value other than "+1," may include a negative value, or may include zero. However, for all L(θ) of the denominator, the case where the coefficients are all zero is excluded (since the denominator of the calculation formula becomes zero and the index becomes an infinite value).

Further, in the above description, when calculating the index corresponding to the particle diameter of the glittering material, an example of calculation using the brightness L* of the L*a*b* color system has been described, but as a substitute for the brightness L*, XYZ stimulus values in the XYZ color system or spectral reflectances may be used for example. Even in this case, since a high correlation is obtained between the calculated index and the particle diameter of the glittering material, it is also possible to compare the particle diameter of the glittering material between different colors based on the index, for example, and the application range of particle diameter determination based on the index is further expanded. Note that a more desirable mode of an example using XYZ stimulus values om the XYZ color system or spectral reflectances as a substitute for the brightness L* will be described in a second embodiment described later.

Therefore, from the above, it can be said that, when the calculation formula used for calculating the index is generalized, the linear sum of the optical parameters for a specific angle can be expressed with a formula that is normalized by a weighted average of the optical parameters for a plurality of angles (for example, all measured angles). In other words, the index B (including the indexes B1 to B3) corresponding to the particle diameter of the glittering material is calculated by the following equations.

$$B=\{a_1 \cdot I(\theta_1)+a_2 \cdot I(\theta_2)+ \ldots +a_n \cdot I(\theta_n)\}/\{b_1 \cdot I(\theta_1)+b_2 \cdot I(\theta_2)+ \ldots +b_n \cdot I(\theta_n)\}$$

Here, n is an integer equal to or greater than 2, angles indicating a plurality of reflection directions on the surface of the object M are $\theta_1$ to $\theta_n$, and optical parameters used for color evaluation for the directions of the angles $\theta_1$ to $\theta_n$ are defined as $I(\theta_1)$ to $I(\theta_n)$ respectively, and the weighting coefficients of the optical parameters $I(\theta_1)$ to $I(\theta_n)$ are defined as two types of $a_1$ to $a_n$ and $b_1$ to $b_n$ respectively.

Note that, regarding the weighting coefficients $a_1$ to $a_n$, one is positive, one is negative, and the rest are positive, negative, or zero. In addition, each of the weighting coefficients $b_1$ to $b_n$ is any one of positive, negative, and zero, excluding a case where all are zero.

From the above considerations, since it can be said that there is a high correlation between the index B and the particle diameter (graininess, texture) of the glittering material used for the metallic coating or the pearl coating, the size of the particle diameter of the glittering material can be evaluated based on the index B. For example, by displaying the calculated index B (numerical value) on the display unit 60, the user can see the index B displayed on the display unit 60 and evaluate the size of the particle diameter of the glittering material. Therefore, the index B for texture evaluation is calculated using only the multi-angle colorimeter 1 and the optical parameters used for color evaluation without using a two-dimensional sensor such as a digital camera, which was used to be required in the past, and the texture (the graininess in this example) can also be evaluated based on the index B in addition to the color evaluation. Therefore, since only the multi-angle colorimeter 1 is used as an apparatus for evaluating the metallic coating and pearl coating (since a two-dimensional sensor such as a digital camera is not needed), this can avoid an increase in size and cost of the above-described apparatus.

Further, regarding the weighting coefficients $a_1$ to $a_n$, since any one is positive and any one is negative, the numerator of the calculation formula of the index B includes the difference between the weights of the optical parameters for two specific angles. Since there is a high correlation between the above difference and the particle diameter of the glittering material, the size of the particle diameter of the glittering material can be appropriately evaluated based on the obtained index B by reflecting the difference in the calculation of the index B.

Further, as described above, the brightness L* can be obtained by calculation according to the received light amount (the reflected light amount) in the light amount detection unit 20 (the calculation can be performed in order of spectral reflectances, tristimulus values XYZ, and then L*a*b*), and the brightness L* is usually used as a parameter for color evaluation (evaluation of brightness). Therefore, by using such brightness L* in the calculation of the index B, that is, by setting all the optical parameters $I(\theta_1)$ to $I(\theta_n)$ used in the calculation of the index B as the brightness L*, both color evaluation and texture evaluation can be reliably performed by using the multi-angle colorimeter 1.

Note that there may be a configuration that the light amount detection unit 20 of the multi-angle colorimeter 1 includes filters having a spectral sensitivity corresponding to the color-matching functions $x(\lambda)$, $y(\lambda)$, and $z(\lambda)$ of the XYZ color system, and a plurality of sensors for the respective filters, and light emitted from the light guide units $21a_2$ to $21f_2$ and transmitted through each filter may be detected by each sensor and an electric signal corresponding to the received light amount may be output from the sensors (an electric signal corresponding to the tristimulus value XYZ) to the control unit 30. In this case, the calculation unit 32 can calculate the brightness L* from the tristimulus values XYZ obtained based on the electric signal, and can calculate the index B using the obtained brightness L*.

Further, in the calculation formula of the index B, at least one of the angles corresponding to the optical parameters multiplied with a positive weighting coefficient among the weighting coefficients $a_1$ to $a_n$ (coefficients included in the numerator of the calculation formula) is an angle within a range of −15° to +45° (highlight) based on the specular reflection direction. For example, in the numerator of the calculation formula, the optical parameter to be multiplied by the positive weighting coefficient is L(−15°) in the numerator of the equation (1), and L(15°) in the numerator of the equation (2), and L(−15°) and L(75°) in the numerator of the equation (3). Note that, in the numerator of the calculation formula, in addition to L(−15°), L(15°), and L(75°), an optical parameter having a positive weighting coefficient may be further included as described above. Therefore, from the above, it can be said that in the numerator of the calculation formula, at least one of the angles corresponding to the optical parameters multiplied with a positive weighting coefficient is the angle of the highlight.

In the highlight range (−15° to 45°), optical parameters (for example, brightness L*) acquired according to the received light amount by the light amount detection unit 20 is larger, compared to the shade range (75° to 110°). For this reason, the difference between the optical parameter multiplied with a positive weighting coefficient and the optical parameter (with a negative weighting coefficient) obtained for another angle is increased to expand the range (dynamic range) that the index B can obtained. This makes it easier to evaluate the texture based on the index B. In other words, based on the index B, the size of the particle diameter of the glittering material can be finely evaluated in a plurality of steps.

Further, at least one of the angles corresponding to the optical parameter multiplied with a negative weighting coefficient among the weighting coefficients $a_1$ to $a_n$ is an angle (highlight) within a range of −15° to +45° with respect to the specular reflection direction. For example, in the numerator of the above equations (1) to (3), the optical parameters multiplied with a negative weighting coefficient are all L(25°). Note that, as described above, the numerator of the calculation formula may further include an optical parameter multiplied with a negative weighting coefficient in addition to L(25°). Therefore, from the above, it can be said that in the numerator of the calculation formula, at least one of the angles corresponding to the optical parameter multiplied with the negative weighting coefficient is the highlight angle.

As described above, the value of the optical parameter obtained in accordance with the amount of light received by the light amount detection unit 20 is larger in the highlight range than in the shade range. For this reason, it is possible to appropriately reflect the information (for example, the brightness L*) of the optical parameter on the index B, and appropriately perform the texture evaluation based on the index B.

In the denominators of the above equations (1) to (3), the weighting coefficients of the respective optical parameters are all "+1." This is equivalent to the above description that each of the weighting coefficients $b_1$ to $b_n$ (coefficients included in the denominator of the calculation formula) being 1 in the calculation formula of the index B. In this case, the denominator of the calculation formula is a simple sum (integral value) of the optical parameters for a plurality of angles, so that the index B can be easily obtained by the calculating operation.

Further, the multi-angle colorimeter 1 according to the present embodiment further includes a display unit 60 that displays the index B calculated by the calculation unit 32. Thus, the user can evaluate the size of the particle diameter of the glittering material by looking at the index B displayed on the display unit 60.

Note that the above description has been made on the premise that the index B calculated by the calculation formula is a positive value; however, the index B may be a negative value. For example, in the numerator of the equation (1), when the weighting coefficient of) L(−15°) is "−1" and the weighting coefficient of L(25°) is "+1," the value of the index B1 is negative. In this case, the size of the particle diameter (graininess and texture) can be evaluated by evaluating the distance of the index (negative value) from the origin (zero).

Second Embodiment

Another embodiment of the present invention will be described below with reference to the drawings. Note that, according to the present embodiment, only parts different from the first embodiment will be described.

In the first embodiment, an example has been described in which brightness L* of the L*a*b* color system is used for calculating an index corresponding to the particle diameter of the glittering material. The brightness L* of the L*a*b* color system depends only on the Y value in the XYZ color system, and the Y value largely contributes to the wavelength band corresponding to G (green) in the RGB color system. Therefore, in the visible light wavelength range (for example, 400 to 700 nm), the spectral reflection intensity (spectral reflectance, reflected light amount) near the center (almost G wavelength range) has a large contribution to the brightness L* (brightness L* is greatly considered), and the spectral reflection intensity in other wavelength ranges (red and blue wavelength ranges) has a small contribution to the brightness L*.

For this reason, for example, in a case of a comparison of the particle diameter of the glittering material between G paint colors or a comparison of the particle diameter of the glittering material between achromatic colors (for example, a comparison of the particle diameter of the glittering material between white paint and silver paint), since a sufficient correlation between the index calculated by the calculation formula and the particle diameter of the glittering material can be obtained, any problem may not be caused even with a calculation formula using the brightness L*. However, in a case of a comparison of the particle diameter of the glittering material between paint colors in a wavelength range (for example, red) where the degree of contribution to the brightness L* is small, or a comparison of the particle diameter of the glittering material between a plurality of different paint colors such as red, green, blue and the like, there is a possibility that a correlation between the calculated index and the particle diameter of the glittering material may not be sufficiently obtained by the calculation formula using the brightness L*.

Therefore, the inventors of the present application have studied the calculation formula of the index B using optical parameters other than the brightness L* among the optical parameters used for color evaluation. Then, the calculation formula found as a result of the study was set as a calculation formula in the calculation unit 32 according to the first embodiment. In other words, the calculation unit 32 calculates the index B represented by the following calculation formula as an index corresponding to the particle diameter of the glittering material.

$$B'_1 = \{a_1 \cdot I'_1(\theta_1) + a_2 \cdot I'_1(\theta_2) + \ldots + a_n \cdot I'_1(\theta_n)\} / \{b_1 \cdot I'_1(\theta_1) + b_2 \cdot I'_1(\theta_2) + \ldots + b_n \cdot I'_1(\theta_n)\}$$

$$B'_2 = \{a_1 \cdot I'_2(\theta_1) + a_2 \cdot I'_2(\theta_2) + \ldots + a_n \cdot I'_2(\theta_n)\} / \{b_1 \cdot I'_2(\theta_1) + b_2 \cdot I'_2(\theta_2) + \ldots + b_n \cdot I'_2(\theta_n)\}$$

. . .

$$B'_m = \{a_1 \cdot I'_m(\theta_1) + a_2 \cdot I'_m(\theta_2) + \ldots + a_n \cdot I'_m(\theta_n)\} / \{b_1 \cdot I'_m(\theta_1) + b_2 \cdot I'_m(\theta_2) + \ldots + b_n \cdot I'_m(\theta_n)\}$$

$$B = B'_1 + B'_2 + \ldots + B'_m$$

Here, assuming that each of n and m is an integer equal to or greater than 2, angles indicating a plurality of reflection directions on the surface of the object M (specular reflection direction is 0°) are $\theta_1$ to $\theta_n$, regarding the respective angles $\theta_1$ to $\theta_n$, the optical parameters for each different wavelength band or for each different wavelength, which are obtained based on the reflected light amount detected by the light amount detection unit 20, are respectively represented by $I'_1(\theta_1)$ to $I'_1(\theta_n)$, $I'_2(\theta_1)$ to $I'_2(\theta_n)$, . . . , $I'_m(\theta_1)$ to $I'_m(\theta_n)$, and each optical parameters $I'_1(\theta_1)$ to $I'_1(\theta_n)$, $I'_2(\theta_1)$ to $I'_2(\theta_n)$, . . . , $I'_m(\theta_1)$ to $I'_m(\theta_n)$ are two types of weighting coefficients including $a_1$ to $a_n$ and $b_1$ to $b_n$, respectively. In addition, regarding the weighting coefficients $a_1$ to $a_n$, one is positive, one is negative, and the rest is positive, negative, or zero. In addition, each of the weighting coefficients $b_1$ to $b_n$ is any of positive, negative, or zero, except a case where all are zero.

Here, as the above optical parameters $I'_1(\theta_1)$ to $I'_1(\theta_n)$, $I'_2(\theta_1)$ to $I'_2(\theta_n)$, . . . , $I'_m(\theta_1)$ to $I'_m(\theta_n)$, a parameter indicating a wavelength dependency whose characteristics vary depending on the wavelength can be used, and more specifically, tristimulus values XYZ or spectral reflectances Ref(λ,θ) at a plurality of wavelengths λ (for example, 400 to 700 nm) can be used. Hereinafter, this will be described in more detail.

(A Case Where the Optical Parameters are Tristimulus Values XYZ)

When the optical parameters are tristimulus values XYZ, the above $I'_1(\theta_1)$ to $I'_1(\theta_n)$, $I'_2(\theta_1)$ to $I'_2(\theta_n)$, . . . , $I'_m(\theta_1)$ to $I'_m(\theta_n)$ may be set as $I'_1(\theta_1)$ to $I'_1(\theta_n)$, $I'_2(\theta_1)$ to $I'_2(\theta_n)$, and $I'_3(\theta_1)$ to $I'_3(\theta_n)$, corresponding to XYZ.

Here, when $$I'_1(\theta_1) \text{ to } I'_1(\theta_n) = X(\theta_1) \text{ to } X(\theta_n)$$

$$I'_2(\theta_1) \text{ to } I'_2(\theta_n) = Y(\theta_1) \text{ to } Y(\theta_n)$$

$$I'_3(\theta_1) \text{ to } I'_3(\theta_n) = Z(\theta_1) \text{ to } Z(\theta_n),$$

$$B'_1 = B'_x = \{a_1 \cdot X(\theta_1) + a_2 \cdot X(\theta_2) + \ldots + a_n \cdot X(\theta_n)\} / \{b_1 \cdot X(\theta_1) + b_2 \cdot X(\theta_2) + \ldots + b_n \cdot X(\theta_n)\}$$

$$B'_2 = B'_y = \{a_1 \cdot Y(\theta_1) + a_2 \cdot Y(\theta_2) + \ldots + a_n \cdot Y(\theta_n)\} / \{b_1 \cdot Y(\theta_1) + b_2 \cdot Y(\theta_2) + \ldots + B_n \cdot Y(\theta_n)\}$$

$$B'_3 = B'_z = \{a_1 \cdot Z(\theta_1) + a_2 \cdot Z(\theta_2) + \ldots + a_n \cdot Z(\theta_n)\} / \{b_1 \cdot Z(\theta_1) + b_2 \cdot Z(\theta_2) + \ldots + b_n \cdot Z(\theta_n)\}$$

and $$B = B'_x + B'_y + B'_z.$$

As a specific example, it can be $$B'_x = \{X(15°) - X(25°)\} / \{(X(-15°) + X(15°) + X(25°) + X(45°) + X(75°) + X(110°)\}$$

$$B'_y = \{Y(15°) - Y(25°)\} / \{(Y(-15°) + Y(15°) + Y(25°) + Y(45°) + Y(75°) + Y(110°)\}$$

$$B'_z = \{Z(15°) - Z(25°)\} / \{(Z(-15°) + Z(15°) + Z(25°) + Z(45°) + Z(75°) + Z(110°)\}$$

$$B = B'_x + B'_y + B'_z.$$

Figure 9:
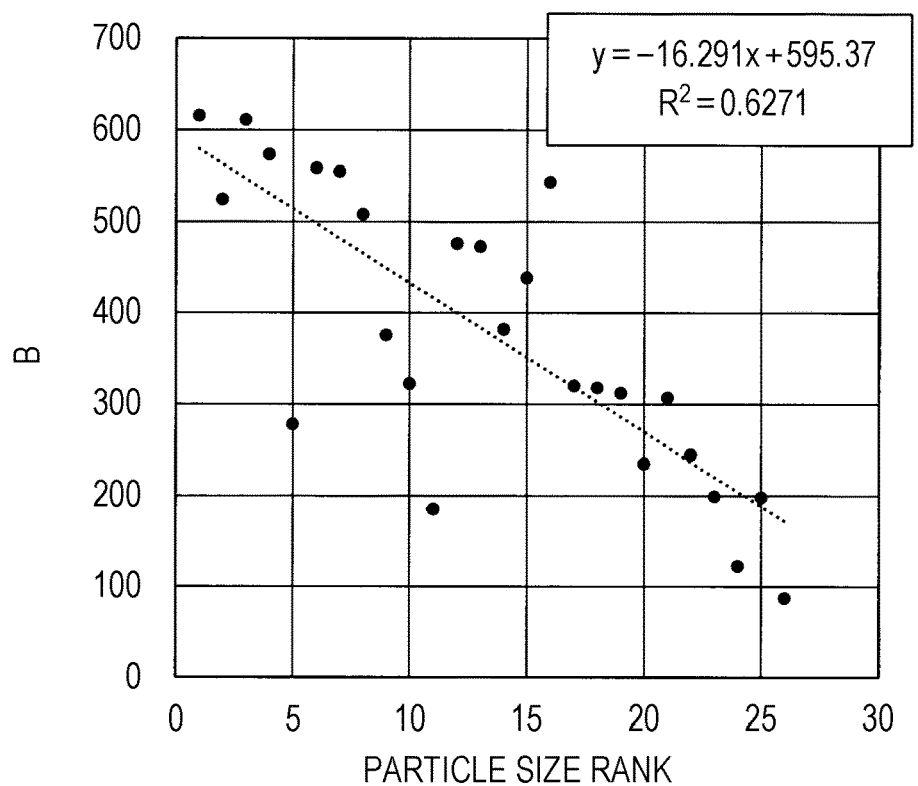
FIG. 9 is an explanatory diagram in which points determined by the particle diameter rank of the glittering material and values of still another index corresponding to the particle diameter of the glittering material are plotted on a coordinate plane.

FIG. 9 is a plot of points determined based on the particle diameter rank of the glittering material and the value of the index B obtained based on $B'_x$, $B'_y$, and $B'_z$ on a coordinate plane for a plurality of samples having different glittering material particle diameters. When a regression line approximating the distribution of each point in the figure is obtained by the least-squares method, y=−16.291x+595.37 was obtained as the regression line, and $R^2$=0.6271 was obtained as the determination coefficient indicating the degree of correlation between the regression line and each point. Therefore, it can be said that the correlation between the index B and the particle diameter of the glittering material is higher than the value of the determination coefficient $R^2$.

Since the tristimulus value XYZ almost corresponds to the RGB color perceived by the human eye, by setting the calculation formula of the index B using the tristimulus value XYZ for each angle as an optical parameter, an index B having a high correlation with the particle diameter of the glittering material over the entire visible light wavelength range can be calculated based the calculation formula. With this configuration, the size of the particle diameter of the glittering material can be appropriately evaluated based on the calculated index B even in a case of comparing particle diameter of the glittering materials between paint colors in the wavelength range where the contribution to the brightness L* is small (between red paint colors or between blue paint colors, for example) or comparing the particle diameter of the glittering material between a plurality of different paint colors (between a red paint color and a blue paint color, for example).

(A Case Where the Optical Parameters are Spectral Reflectances)

When the optical parameters are spectral reflectances Ref(λ,θ) at a plurality of wavelengths λ, the above $I'_1(\theta_1)$ to $I'_1(\theta_n)$ and $I'_2(\theta_1)$ to $I'_2(\theta_n)$, ..., $I'_m(\theta_1)$ to $I'_m(\theta_n)$ can be expressed as $$I'_1(\theta_1) \text{ to } I'_1(\theta_n) = Ref(\lambda_1, \theta_1) \text{ to } Ref(\lambda_1, \theta_n)$$
$$I'_2(\theta_1) \text{ to } I'_2(\theta_n) = Ref(\lambda_2, \theta_1) \text{ to } Ref(\lambda_2, \theta_n)$$
$$\ldots$$
$$I'_m(\theta_1) \text{ to } I'_m(\theta_n) = Ref(\lambda_m, \theta_1) \text{ to } Ref(\lambda_m, \theta_n)$$

where a plurality of wavelengths λ are $\lambda_1, \lambda_2, \ldots \lambda_m$.

In this case, it can be $$B'_1 = \{a_1 \cdot Ref(\lambda_1, \theta_1) + a_2 \cdot Ref(\lambda_1, \theta_2) + \ldots + a_n \cdot Ref(\lambda_1, \theta_n)\} /$$
$$\{b_1 \cdot Ref(\lambda_1, \theta_1) + b_2 \cdot Ref(\lambda_1, \theta_2) + \ldots + b_n \cdot Ref(\lambda_1, \theta_n)\}$$

$$B'_2 = \{a_1 \cdot Ref(\lambda_2, \theta_1) + a_2 \cdot Ref(\lambda_2, \theta_2) + \ldots + a_n \cdot Ref(\lambda_2, \theta_n)\} /$$
$$\{b_1 \cdot Ref(\lambda_2, \theta_1) + b_2 \cdot Ref(\lambda_1, \theta_2) + \ldots + b_n \cdot Ref(\lambda_2, \theta_n)\}$$

$$\ldots$$

$$B'_m = \{a_1 \cdot Ref(\lambda_m, \theta_1) + a_2 \cdot Ref(\lambda_m, \theta_2) + \ldots + a_n \cdot Ref(\lambda_m, \theta_n)\} /$$
$$\{b_1 \cdot Ref(\lambda_m, \theta_1) + b_2 \cdot Ref(\lambda_m, \theta_2) + \ldots + b_n \cdot Ref(\lambda_m, \theta_n)\}$$

and $$B = B'_1 + B'_2 + \ldots + B'_m.$$

As a specific example, in the case where wavelengths of every 10 nm are considered in the range of 400 to 700 nm of visible light as the plurality of wavelengths λ, the index B can be calculated as follows.

$B'_1$={Ref(400 nm,15°)−Ref(400 nm,25°)}/{Ref(400 nm,−15°)+Ref(400 nm,15°)+Ref(400 nm,25°)+Ref(400 nm,45°)+Ref(400 nm,75°)+Ref(400 nm,110°)}

$B'_2$={Ref(410 nm,15°)−Ref(410 nm,25°)}/{Ref(410 nm,−15°)+Ref(410 nm,15°)+Ref(410 nm,25°)+Ref(410 nm,45°)+Ref(410 nm,75°)+Ref(410 nm,110°)}

...

$B'_{31}$={Ref(700 nm,15°)−Ref(700 nm,25°)}/{Ref(700 nm,−15°)+Ref(700 nm,15°)+Ref(700 nm,25°)+Ref(700 nm,45°)+Ref(700 nm,75°)+Ref(700 nm,110°)}

$B = B'_1 + B'_2 + \ldots + B'_{31}$

Figure 10:
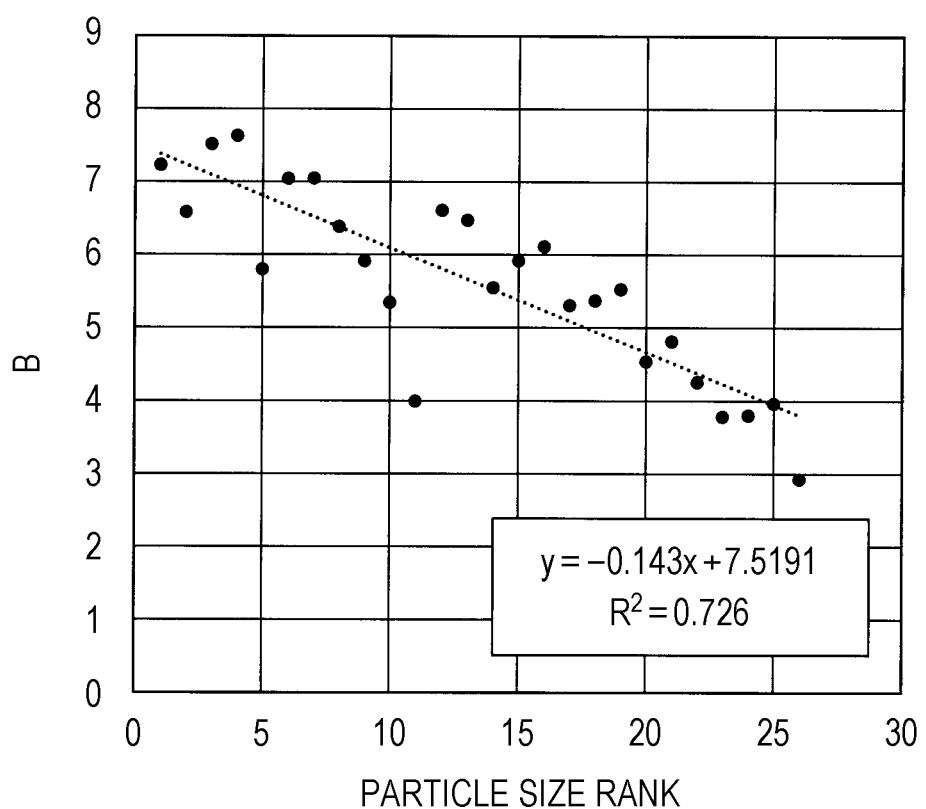
FIG. 10 is an explanatory diagram in which points determined by the particle diameter rank of the glittering material and values of still another index corresponding to the particle diameter of the glittering material are plotted on a coordinate plane.

FIG. 10 is a plot of points determined by the particle diameter ranks of the glittering material and the value of the index B obtained based on $B'_1$ to $B'_{31}$ on a coordinate plane for a plurality of samples having different glittering material particle diameters. When a regression line approximating the distribution of each point in the figure is obtained by the least-squares method, y=−0.143x+7.5191 is obtained as the regression line, and $R^2$=0.726 is obtained as the determination coefficient indicating the degree of correlation between the regression line and each point. Therefore, it can be said that the correlation between the index B and the particle diameter of the glittering material is higher than the value of the determination coefficient $R^2$.

By setting the calculation formula of the index B using the spectral reflectance Ref(λ, θ) for each wavelength λ and each angle as the optical parameters, an index B having a high correlation with the particle diameter of the glittering material over the entire visible light wavelength range can be calculated based on this calculation formula. Therefore, as in the case where the tristimulus values XYZ are used as the optical parameters, the size of the particle diameter of the glittering material can be appropriately evaluated based on the calculated index B even in a case of comparing the particle diameter of the glittering material between the paint colors in the wavelength range in which the contribution to the brightness L* is small, or comparing particle diameter of the glittering material between a plurality of different paint colors.

Third Embodiment

The following will describe still another embodiment of the present invention with reference to the drawings. Note that, in the present embodiment, only parts different from the first and second embodiments will be described.

With a smaller particle diameter of the glittering material (with finer particles of the glittering material), more incident light will penetrate into the sample and be reflected by the glittering material. This increases the probability that the incident light is reflected by the glittering material having an inclination and, since the absorption loss inside the glittering material or the paint increases, the sum of the light amounts in all directions decreases when reflected to the outside of the sample. Conversely, with a larger particle diameter of the glittering material (with coarser particles of the glittering material), there may be a higher probability that incident light is reflected by the glittering material near the sample surface, and a fewer chances of reflection by the glittering material inside the sample. Then, since the absorption loss inside the glittering material or the paint becomes small, the sum of the light amounts in all directions increases when the incident light is reflected to outside the sample.

Therefore, when light is received by a light receiving means such as an integrating sphere that receives the sum of reflected light in all directions (for example, CM-700d manufactured by Konica Minolta Co., Ltd.), the output value from the light receiving means tends to be smaller when the particle diameter of the glittering material is small and be greater when the particle diameter of the glittering material is large.

On the other hand, even with a measuring instrument such as a multi-angle colorimeter that can individually receive reflected light at a plurality of angles, the same effect as described above can be obtained by summing the outputs at each angle including the vicinity of specular reflection. In other words, it is possible to calculate an index corresponding to the particle diameter of the glittering material by summing the outputs for the plurality of angles.

Therefore, in the present embodiment, based on the above consideration, the index B represented by the following equation was set as the calculation formula of the index in the calculation unit 32 when the 6-angle multi-angle colorimeter 1 capable of color measurement at a plurality of angles As(−15°), As(15°), As(25°), As(45°), As(75°), and As(110°). In other words, $$B = L(-15°) + L(15°) + L(25°) + L(45°) + L(75°) + L(110°).$$

Figure 11:
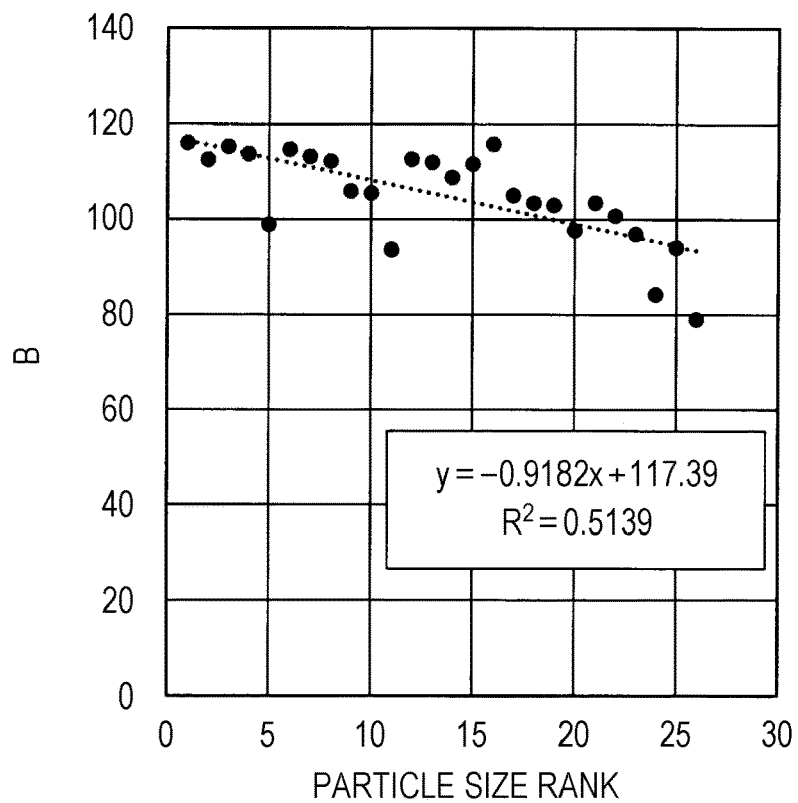
FIG. 11 is an explanatory diagram in which points determined by the particle diameter rank of the glittering material and values of still another index corresponding to the particle diameter of the glittering material are plotted on a coordinate plane.

FIG. 11 is a plot of points determined the particle diameter rank of the glittering material and the value of the index B calculated using the above equation on a coordinate plane for a plurality of samples having different glittering material particle diameters. When the regression line was determined by the least-squares method, $y = -0.9182x + 117.39$ was obtained as the regression line, and $R^2 = 0.5139$ was obtained as the determination coefficient. Therefore, it can be said that the correlation between the above index B and the particle diameter of the glittering material is high.

In the above description, an example has been described in which the index B is calculated using $L(\theta)$ indicating the brightness L* obtained for the angle θ as the optical parameter; however, the index B may be calculated using the tristimulus values XYZ or the spectral reflectances $Ref(\lambda, \theta)$ at a plurality of wavelengths λ (for example, 400 to 700 nm). For example, when the tristimulus values XYZ are used as the optical parameters, the index B represented by the following equation may be set as the index calculation formula used in the calculation unit 32. The calculation formula is:

$$B'_1 = X(-15°) + X(15°) + X(25°) + X(45°) + X(75°) + X(110°)$$

$$B'_2 = Y(-15°) + Y(15°) + Y(25°) + Y(45°) + Y(75°) + Y(110°)$$

$$B'_3 = Z(-15°) + Z(15°) + Z(25°) + Z(45°) + Z(75°) + Z(110°)$$

$$B = B'_1 + B'_2 + B'_3$$

Figure 12:
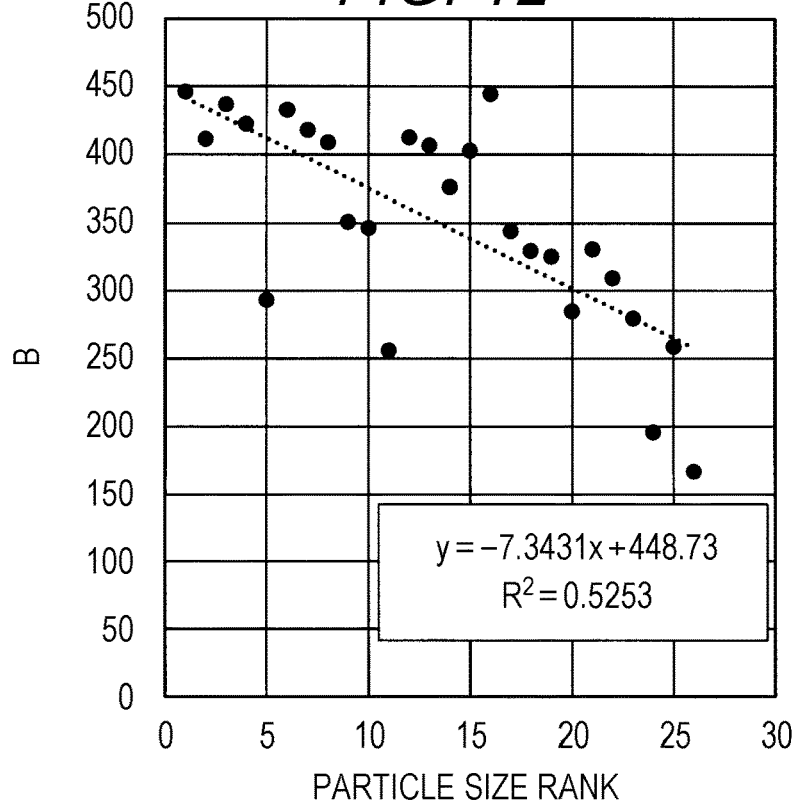
FIG. 12 is an explanatory diagram in which points determined by the particle diameter rank of the glittering material and values of still another index corresponding to the particle diameter of the glittering material are plotted on a coordinate plane.

FIG. 12 is a plot of points determined the particle diameter rank of the glittering material and the value of the index B calculated using the above equation on a coordinate plane for a plurality of samples having different glittering material particle diameters. When the regression line was determined by the least-squares method, $y = -7.3431x + 448.73$ was obtained as the regression line, and $R^2 = 0.5253$ was obtained as the determination coefficient. Therefore, it can be said that the correlation between the above index B and the particle diameter of the glittering material is high.

Note that, according to the present embodiment, the index B (summed value) is calculated by summing the optical parameters obtained for the six angles; however, the calculation formula for obtaining the index B is not limited to the above formula. Although detailed verification is omitted, if the index B is calculated by summing the optical parameters for at least two angles, it has been found, from various studies, that high correlation between the calculated index B and the particle diameter of the glittering material can be obtained.

As described above, in the present embodiment, the calculation unit 32 as an index calculation unit obtains optical parameters (brightness L*, XYZ stimulus values, spectral reflectances, etc.) used for color evaluation of metallic coating or pearl coating, and then sums the obtained optical parameters for at least two or more angles to obtain a summed value as an index corresponding to the particle diameter of the glittering material used in metallic coating or pearl coating. In this case, the same effect as in the first or second embodiment can be obtained. In other words, without separately using a two-dimensional sensor such as a digital camera, the index B can be calculated using only the multi-angle colorimeter 1 and using the optical parameters used for color evaluation and the texture (graininess) can also be evaluated based on the value of the index B in addition to the color evaluation. Therefore, only the multi-angle colorimeter 1 is needed as an apparatus used for evaluating the metallic coating and the pearl coating, and this avoids an increase in size and cost of the apparatus.

Furthermore, according to the first and second embodiments, it is needed to set a negative value in addition to a positive value as the weighting coefficient of the optical parameter used for calculating the index B. On the other hand, according to the present embodiment, it is only necessary to set a positive value as the weighting coefficient, and since the weighting coefficient is "+1" which is a simple sum of the respective optical parameters, the index B can be easily and quickly calculated. With this configuration, after the measurement by the multi-angle colorimeter 1 is started, the index B can be quickly acquired and displayed on the display unit 60, and the user can start evaluating texture (graininess) based on the displayed index B.

Further, since the optical parameters used for calculating the index B include any of brightness L*, tristimulus values XYZ, and spectral reflectances $Ref(\lambda, \theta)$ at a plurality of wavelengths λ, the index B having a high correlation with the graininess can be surely obtained by using those parameters.

Note that, since the index B calculated in the present embodiment is a summed value of the optical parameters obtained for at least two angles, displaying the index B on the display unit 60 causes the display unit 60 to display the summed value. By displaying such a summed value, the user can evaluate the graininess based on the summed value.

In addition, it can be said that the index B described in the present embodiment is calculated by the following calculation formula.

For example, when n is an integer equal to or greater than 2, and the optical parameters obtained based on the amount of reflected light detected by the light amount detection unit 20 for each of the angles $\theta_1$ to $\theta_n$ are $I(\theta_1)$ to $I(\theta_n)$ respectively, the index B is calculated by the following calculation formula. $B = I(\theta_1) + I(\theta_2) + \ldots + I(\theta_n)$ In particular, when the optical parameters $I(\theta_1)$ to $I(\theta_n)$ are all brightness L*, the brightness L* obtained for the angles $\theta_1$ to $\theta_n$ is $L(\theta_1)$ to $L(\theta_n)$, and the index B is calculated by the following calculation. $B = L(\theta_1) + L(\theta_2) + \ldots + L(\theta_n)$ Further, when n and m are each an integer equal to or greater than 2, and the optical parameters obtained for each of the different wavelength bands or for each of the different wavelengths obtained based on the reflected light amount are $I'_1(\theta_1)$ to $I'_1(\theta_n)$, $I'_2(\theta_1)$ to $I'_2(\theta_n)$, ..., $I'_m(\theta_1)$ to $I'_m(\theta_n)$ respectively, the index B is calculated by the following calculation formula. $B'_1 = I'_1(\theta_1) + I'_1(\theta_2) + \ldots + i'_1(\theta_n)$ $$B'_2 = I'_2(\theta_1) + I'_2(\theta_2) + \ldots + I'_2(\theta_n), \ldots,$$

$$B'_m = I'_m(\theta_1) + I'_m(\theta_2) + \ldots + I'_m(\theta_n)$$

$$B = B'_1 + B'_2 + \ldots B'_m$$

In particular, when the optical parameters are tristimulus values XYZ, and $$I'_1(\theta_1) \text{ to } I'1(\theta_n) = X(\theta_1) \text{ to } X(\theta_n)$$

$$I'_2(\theta_1) \text{ to } I'_2(\theta_n) = Y(\theta_1) \text{ to } Y(\theta_n)$$

$$I'_3(\theta_1) \text{ to } I'_3(\theta_n) = Z(\theta_1) \text{ to } Z(\theta_n),$$

the index B is calculated by the following calculation formula. $B'_1 = B'_x = X(\theta_1) + X(\theta_2) + \ldots + X(\theta_n)$ $$B'_2 = B'_y = Y(\theta_1) + Y(\theta_2) + \ldots + Y(\theta_n)$$

$$B'_3 = B'_z = Z(\theta_1) + Z(\theta_2) + \ldots + Z(\theta_n)$$

$$B = B'_x + B'_y + B'_z$$

Further, when the optical parameters are spectral reflectances Ref($\lambda$, $\theta$) at a plurality of wavelengths $\lambda$, the plurality of wavelengths $\lambda$ are $\lambda_1, \lambda_2, \ldots, \lambda_m$, and $$I'_1(\theta_1) \text{ to } I'_1(\theta_n) = \text{Ref}(\lambda_1,\theta_1) \text{ to } \text{Ref}(\lambda_1,\theta_n)$$

$$I'_2(\theta_1) \text{ to } I'_2(\theta_n) = \text{Ref}(\lambda_2,\theta_1) \text{ to } \text{Ref}(\lambda_2,\theta_n)$$

...

$$I'_m(\theta_1) \text{ to } I'_m(\theta_n) = \text{Ref}(\lambda_m,\theta_1) \text{ to } \text{Ref}(\lambda_m,\theta_n),$$

the index B is calculated by the following calculation formula. $B'_1 = \text{Ref}(\lambda_1,\theta_1) + \text{Ref}(\lambda_1,\theta_2) + \ldots + \text{Ref}(\lambda_1,\theta_n)$ $$B'_2 = \text{Ref}(\lambda_2,\theta_1) + \text{Ref}(\lambda_2,\theta_2) + \ldots + \text{Ref}(\lambda_2,\theta_n) \ldots$$

$$B'_m = \text{Ref}(\lambda_m,\theta_1) + \text{Ref}(\lambda_m,\theta_2) + \ldots + \text{Ref}(\lambda_m,\theta_n)\}$$

and $$B = B'_1 + B'_2 + \ldots B'_m$$

[Others]

The multi-angle colorimeter described in each of the above embodiments can also be expressed as follows.

In other words, the multi-angle colorimeter described above includes a light emitting unit that emits light onto an object, a light amount detection unit that receives the light emitted from the light emitting unit and reflected by the object in a plurality of directions of angles, and detects a reflected light amount in each of the angle, and an index calculation unit that obtains optical parameters, which are used in color evaluation of metallic coating or pearl coating on a surface of the object, based on the reflected light amount, and calculates, using the optical parameters, an index corresponding to a particle diameter of a glittering material used in the metallic coating or the pearl coating, in which the index calculation unit calculates index B expressed by a following equation as the index corresponding to the particle diameter of the glittering material, when n is an integer equal to or greater than 2, the plurality of angles are $\theta_1$ to $\theta_n$ respectively, the optical parameters obtained for the respective angles $\theta_1$ to $\theta_n$ based on the reflected light amount are $I(\theta_1)$ to $I(\theta_n)$ respectively, and weighting coefficients of the respective optical parameters $I(\theta_1)$ to $I(\theta_n)$ are two types of $a_1$ to $a_n$ and $b_1$ to $b_n$ respectively, $$B = \{a_1 \cdot I(\theta_1) + a_2 \cdot I(\theta_2) + \ldots + a_n \cdot I(\theta_n)\} / \{b_1 \cdot I(\theta_1) + b_2 \cdot I(\theta_2) + \ldots + b_n \cdot I(\theta_n)\}$$

where regarding the weighting coefficients $a_1$ to $a_n$, one is positive, another is negative, and rest is positive, negative or zero, and each of the weighting coefficients $b_1$ to $b_n$ is positive, negative or zero, except a case where all are zero.

In the above multi-angle colorimeter, the optical parameters $I(\theta_1)$ to $I(\theta_n)$ may all be brightness L*.

The multi-angle colorimeter described above includes a light emitting unit that emits light onto an object, a light amount detection unit that receives the light emitted from the light emitting unit and reflected by the object in a plurality of directions of angles, and detects a reflected light amount in each of the angle, and an index calculation unit that obtains optical parameters, which are used in color evaluation of metallic coating or pearl coating on a surface of the object, based on the reflected light amount, and calculates, using the optical parameters, an index corresponding to a particle diameter of a glittering material used in the metallic coating or the pearl coating, in which the index calculation unit calculates index B expressed by a following equation as the index corresponding to the particle diameter of the glittering material, when n and m are respectively an integer equal to or greater than 2, the plurality of angles are $\theta_1$ to $\theta_n$ respectively, the optical parameters obtained for the respective angles $\theta_1$ to $\theta_n$ based on the reflected light amount for each different wavelength band or each different wavelength are $I'_1(\theta_1)$ to $I'_1(\theta_n)$, $I'_2(\theta_1)$ to $I'_2(\theta_n), \ldots, I'_m(\theta_1)$ to $I'_m(\theta_n)$ respectively, and weighting coefficients of the respective optical parameters $I'_1(\theta_1)$ to $I'_1(\theta_n), I'_2(\theta_1)$ to $I'_2(\theta_n), \ldots, I'_m(\theta_n)$ are two types of $a_1$ to $a_n$, and $b_1$ to $b_n$, respectively, $$B'_1 = \{a_1 \cdot I'_1(\theta_1) + a_2 \cdot I'_1(\theta_2) + \ldots + a_n \cdot I'_1(\theta_n)\} / \{b_1 \cdot I'_1(\theta_1) + b_2 \cdot I'_1(\theta_2) + \ldots + b_n \cdot I'_1(\theta_n)\}$$

$$B'_2 = \{a_1 \cdot I'_2(\theta_1) + a_2 \cdot I'_2(\theta_2) + \ldots + a_n \cdot I'_2(\theta_n)\} / \{b_1 \cdot I'_2(\theta_1) + b_2 \cdot I'_2(\theta_2) + \ldots + b_n \cdot I'_2(\theta_n)\}$$

...

$$B'_m = \{a_1 \cdot I'_m(\theta_1) + a_2 \cdot I'_m(\theta_2) + \ldots + a_n \cdot I'_m(\theta_n)\} / \{b_1 \cdot I'_m(\theta_1) + b_2 \cdot I'_m(\theta_2) + \ldots + b_n \cdot I'_m(\theta_n)\}$$

$$B = B'_1 + B'_2 + \ldots B'_m$$

where regarding the weighting coefficients $a_1$ to $a_n$, one is positive, another is negative, and rest is positive, negative, or zero, and the respective weighting coefficients $b_1$ to $b_n$ are positive, negative, or zero, except a case where all are zero.

In the above multi-angle colorimeter, when the optical parameters are tristimulus values XYZ, $$I'_1(\theta_1) \text{ to } I'_1(\theta_n) = X(\theta_1) \text{ to } X(\theta_n)$$

$$I'_2(\theta_1) \text{ to } I'_2(\theta_n) = Y(\theta_1) \text{ to } Y(\theta_n)$$

$$I'_3(\theta_1) \text{ to } I'_3(\theta_n) = Z(\theta_1) \text{ to } Z(\theta_n),$$

it may be $$B'_1 = B'_x = \{a_1 \cdot X(\theta_1) + a_2 \cdot X(\theta_2) + \ldots + a_n \cdot X(\theta_n)\} / \{b_1 \cdot X(\theta_1) + b_2 \cdot X(\theta_2) + \ldots + b_n \cdot X(\theta_n)\},$$

$$B'_2 = B'_y = \{a_1 \cdot Y(\theta_1) + a_2 \cdot Y(\theta_2) + \ldots + a_n \cdot Y(\theta_n)\} / \{b_1 \cdot Y(\theta_1) + b_2 \cdot Y(\theta_2) + \ldots + b_n \cdot Y(\theta_n)\}$$

$$B'_3 = B'_z = \{a_1 \cdot Z(\theta_1) + a_2 \cdot Z(\theta_2) + \ldots + a_n \cdot Z(\theta_n)\} / \{b_1 \cdot Z(\theta_1) + b_2 \cdot Z(\theta_2) + \ldots + b_n \cdot Z(\theta_n)\}$$

and $$B = B'_x + B'_y + B'_z.$$

In the above multi-angle colorimeter, when the optical parameters are spectral reflectances Ref(λ, θ) at a plurality of wavelengths λ, the plurality of wavelengths λ are $\lambda_1, \lambda_2, \ldots, \lambda_m$, and $$I'_1(\theta_1) \text{ to } I'_1(\theta_n) = \text{Ref}(\lambda_1, \theta_1) \text{ to } \text{Ref}(\lambda_1, \theta_n)$$

$$I'_2(\theta_1) \text{ to } I'_2(\theta_n) = \text{Ref}(\lambda_2, \theta_1) \text{ to } \text{Ref}(\lambda_2, \theta_n) \ldots$$

$$I'_m(\theta_1) \text{ to } I'_m(\theta_n) = \text{Ref}(\lambda_m, \theta_1) \text{ to } \text{Ref}(\lambda_m, \theta_n),$$

it may be $$B'_1 = \{a_1 \cdot Ref(\lambda_1, \theta_1) + a_2 \cdot Ref(\lambda_1, \theta_2) + \ldots + a_n \cdot Ref(\lambda_1, \theta_n)\} /$$
$$\{b_1 \cdot Ref(\lambda_1, \theta_1) + b_2 \cdot Ref(\lambda_1, \theta_2) + \ldots + b_n \cdot Ref(\lambda_1, \theta_n)\}$$
$$B'_2 = \{a_1 \cdot Ref(\lambda_2, \theta_1) + a_2 \cdot Ref(\lambda_2, \theta_2) + \ldots + a_n \cdot Ref(\lambda_2, \theta_n)\} /$$
$$\{b_1 \cdot Ref(\lambda_2, \theta_1) + b_2 \cdot Ref(\lambda_2, \theta_2) + \ldots + b_n \cdot Ref(\lambda_2, \theta_n)\} \ldots$$
$$B'_m = \{a_1 \cdot Ref(\lambda_m, \theta_1) + a_2 \cdot Ref(\lambda_m, \theta_2) + \ldots + a_n \cdot Ref(\lambda_m, \theta_n)\} /$$
$$\{b_1 \cdot Ref(\lambda_m, \theta_1) + b_2 \cdot Ref(\lambda_m, \theta_2) + \ldots + b_n \cdot Ref(\lambda_m, \theta_n)\}$$

and may be $$B = B'_1 + B'_2 + \ldots B'_m.$$

In the multi-angle colorimeter, when the specular reflection direction is set to 0° in a plane including an incident direction and a specular reflection direction of a principal light beam of the light emitted from the light emitting unit with respect to the object, and an angle direction inclined from the specular reflection direction toward the incident direction is defined as a positive direction, at least one of the angles corresponding to the optical parameters multiplied with the positive weighting coefficient among the weighting coefficients $a_1$ to $a_n$ may correspond to an angle within the range of −15° to +45° with respect to the specular reflection direction.

In the multi-angle colorimeter, when the specular reflection direction is set to 0° in a plane including an incident direction and a specular reflection direction of a principal light beam of the light emitted from the light emitting unit with respect to the object, and an angle direction inclined from the specular reflection direction toward the incident direction is defined as a positive direction, at least one of the angles corresponding to the optical parameters multiplied with the negative weighting coefficient among the weighting coefficients $a_1$ to $a_n$ may correspond to an angle within the range of −15° to +45° with respect to the specular reflection direction.

In the above multi-angle colorimeter, each of the weighting coefficients $b_1$ to $b_n$ may be 1.

The multi-angle colorimeter described above includes a light emitting unit that emits light onto an object, a light amount detection unit that receives the light emitted from the light emitting unit and reflected by the object in a plurality of directions of angles, and detects a reflected light amount in each of the angle, and an index calculation unit that obtains optical parameters, which are used in color evaluation of metallic coating or pearl coating on a surface of the object, based on the reflected light amount, then sums the optical parameters of at least two or more angles, and obtains a summed value as an index corresponding to a particle diameter of a glittering material used in the metallic coating or the pearl coating.

In the above multi-angle colorimeter, the optical parameter may include any of brightness L*, tristimulus values XYZ, and spectral reflectances Ref(λ, θ) at a plurality of wavelengths λ.

The above-described multi-angle colorimeter may further include a display unit that displays the index B or the summed value calculated by the index calculation unit.

As described above, the embodiments of the present invention have been described. However, the scope of the present invention is not limited to the embodiments, and can be extended or modified without departing from the gist of the invention.

INDUSTRIAL APPLICABILITY

The present invention is applicable to a multi-angle colorimeter used in color evaluation of metallic coating or pearl coating in the field of industrial products such as automobiles.

REFERENCE SIGNS LIST

1 Multi-angle colorimeter
10 Light emitting unit
20 Light amount detection unit
32 Calculation unit (Index calculation unit)
60 Display unit
M Object

The invention claimed is:

1. A multi-angle colorimeter comprising:
a light emitter that emits light onto an object;
a light amount detector that receives the light emitted from the light emitter and reflected by the object in a plurality of directions of angles, and detects a reflected light amount in each of the angle; and
a hardware processor that obtains optical parameters, which are used in color evaluation of metallic coating or pearl coating on a surface of the object, based on the reflected light amount, and calculates, using the optical parameters, an index corresponding to a particle diameter of a glittering material used in the metallic coating or the pearl coating, wherein
the hardware processor calculates index B expressed by a following equation as the index corresponding to the particle diameter of the glittering material,
when
n is an integer equal to or greater than 2,
the plurality of angles are $\theta_1$ to $\theta_n$ respectively,
the optical parameters obtained for the respective angles $\theta_1$ to $\theta_n$ based on the reflected light amount are $I(\theta_1)$ to $I(\theta_n)$ respectively, and
weighting coefficients of the respective optical parameters $I(\theta_1)$ to $I(\theta_n)$ are two types of $a_1$ to $a_n$ and $b_1$ to $b_n$ respectively, $$B = \{a_1 \cdot I(\theta_1) + a_2 \cdot I(\theta_2) + \ldots + a_n \cdot I(\theta_n)\} / \{b_1 \cdot I(\theta_1) + b_2 \cdot I(\theta_2) + \ldots + b_n \cdot I(\theta_n)\}$$

where,
regarding the weighting coefficients $a_1$ to $a_n$, one is positive, another is negative, and rest is positive, negative, or zero, and
each of the weighting coefficients $b_1$ to $b_n$ is positive, negative or zero, except a case where all are zero.

2. The multi-angle colorimeter according to claim 1, wherein
the respective optical parameters $I(\theta_1)$ to $I(\theta_n)$ are all brightness L*.

3. The multi-angle colorimeter according to claim 2, wherein
when the specular reflection direction is 0° on a plane including an incident direction and a specular reflection direction of a principal light beam of the light emitted from the light emitter with respect to the object, and an angle direction inclined from the specular reflection direction toward the incident direction is defined as a positive direction,
at least one of angles corresponding to the optical parameters multiplied with a positive weighting coefficient of the weighting coefficient $a_1$ to $a_n$ is an angle in a range from −15° to +45° with respect to the specular reflection direction.

4. The multi-angle colorimeter according to claim 2, wherein
when the specular reflection direction is 0° on a plane including an incident direction and a specular reflection direction of a principal light beam of the light emitted from the light emitter with respect to the object, and an angle direction inclined from the specular reflection direction toward the incident direction is defined as a positive direction,
at least one of angles corresponding to the optical parameters multiplied with a negative weighting coefficient of the weighting coefficient $a_1$ to $a_n$ is an angle in a range from −15° to +45° with respect to the specular reflection direction.

5. The multi-angle colorimeter according to claim 2, wherein each of the weighting coefficients $b_1$ to $b_n$ is 1.

6. The multi-angle colorimeter according to claim 2, further comprising
a display that displays the index B or the summed value, which is calculated by the hardware processor.

7. The multi-angle colorimeter according to claim 1, wherein
when the specular reflection direction is 0° on a plane including an incident direction and a specular reflection direction of a principal light beam of the light emitted from the light emitter with respect to the object, and an angle direction inclined from the specular reflection direction toward the incident direction is defined as a positive direction,
at least one of angles corresponding to the optical parameters multiplied with a positive weighting coefficient of the weighting coefficient $a_1$ to $a_n$ is an angle in a range from −15° to +45° with respect to the specular reflection direction.

8. The multi-angle colorimeter according to claim 1, wherein
when the specular reflection direction is 0° on a plane including an incident direction and a specular reflection direction of a principal light beam of the light emitted from the light emitter with respect t9o the object, and an angle direction inclined from the specular reflection direction toward the incident direction is defined as a positive direction,
at least one of angles corresponding to the optical parameters multiplied with a negative weighting coefficient of the weighting coefficient $a_1$ to $a_n$ is an angle in a range from −15° to +45° with respect to the specular reflection direction.

9. The multi-angle colorimeter according to claim 1, wherein
each of the weighting coefficients $b_1$ to $b_n$ is 1.

10. The multi-angle colorimeter according to claim 1, further comprising
a display that displays the index B or the summed value, which is calculated by the hardware processor.

11. A multi-angle colorimeter comprising:
a light emitter that emits light onto an object;
a light amount detector that receives the light emitted from the light emitter and reflected by the object in a plurality of directions of angles, and detects a reflected light amount in each of the angle; and
a hardware processor that obtains optical parameters, which are used in color evaluation of metallic coating or pearl coating on a surface of the object, based on the reflected light amount, and calculates, using the optical parameters, an index corresponding to a particle diameter of a glittering material used in the metallic coating or the pearl coating, wherein
the hardware processor calculates index B expressed by a following equation as the index corresponding to the particle diameter of the glittering material,
when
n and m are respectively an integer equal to or greater than 2,
the plurality of angles are $\theta_1$ to $\theta_n$ respectively,
the optical parameters obtained for the respective angles $\theta_1$ to $\theta_n$ based on the reflected light amount for each different wavelength band or each different wavelength are $I'_1(\theta_1)$ to $I'_1(\theta_n)$, $I'_2(\theta_1)$ to $I'_2(\theta_n)$, ..., $I'_m(\theta_1)$ to $I'_m(\theta_n)$ respectively, and
weighting coefficients of the respective optical parameters $I'I(\theta_1)$ to $I'_1(\theta_n)$, $I'_2(\theta_1)$ to $I'_2(\theta_n)$, ..., $I'_m(\theta_n)$ to $I'_m(\theta_n)$ are two types of $a_1$ to $a_n$ and $b_1$ to $b_n$ respectively, $$B'_1=\{a_1 \cdot I'_1(\theta_1)+a_2 \cdot I'_1(\theta_2)+ \ldots +a_n \cdot I'_1(\theta_n)\}/\{b_1 \cdot I'_1(\theta_1)+b_2 \cdot I'_1(\theta_2)+ \ldots +b_n \cdot I'_1(\theta_n)\}$$

$$B'_2=\{a_1 \cdot I'_2(\theta_1)+a_2 \cdot I'_2(\theta_2)+ \ldots +a_n \cdot I'_2(\theta_n)\}/\{b_1 \cdot I'_2(\theta_1)+b_2 \cdot I'_2(\theta_2)+ \ldots +b_n \cdot I'_2(\theta_n)\}$$

. . .

$$B'_m=\{a_m \cdot I'_1(\theta_1)+a_2 \cdot I'_m(\theta_2)+ \ldots +a_n \cdot I'_m(\theta_n)\}/\{b_1 \cdot I'_m(\theta_1)+b_2 \cdot I'_m(\theta_2)+ \ldots +b_n \cdot I'_m(\theta_n)\}$$

$$B=B'_1+ \ldots +B'_m$$

where,
regarding the weighting coefficients $a_1$ to $a_n$, one is positive, another is negative, and rest is positive, negative, or zero, and
the respective weighting coefficients $b_1$ to $b_n$ are positive, negative, or zero, except a case where all are zero.

12. The multi-angle colorimeter according to claim 11, wherein
the optical parameters are tristimulus values XYZ, and when $$I'_1(\theta_1) \text{ to } I'_1(\theta_n)=X(\theta_1) \text{ to } X(\theta_n),$$

$$I'_2(\theta_1) \text{ to } I'_2(\theta_n)=Y(\theta_1) \text{ to } Y(\theta_n),$$

$$I'_3(\theta_1) \text{ to } I'_3(\theta_n)=Z(\theta_1) \text{ to } Z(\theta_n),$$

$$B'_1=B'_x=\{a_1 \cdot X(\theta_1)+a_2 \cdot X(\theta_2)+ \ldots +a_n \cdot X(\theta_n)\}/\{b_1 \cdot X(\theta_1)+b_2 \cdot X(\theta_2)+ \ldots +b_n \cdot X(\theta_n)\}$$

$$B'_2=B'_y=\{a_1 \cdot Y(\theta_1)+a_2 \cdot Y(\theta_2)+ \ldots +a_n \cdot Y(\theta_n)\}/\{b_1 \cdot Y(\theta_1)+b_2 \cdot Y(\theta_2)+ \ldots +b_n \cdot Y(\theta_n)\}$$

$$B'_3=B'_z=\{a_1 \cdot Z(\theta_1)+a_2 \cdot Z(\theta_2)+ \ldots +a_n \cdot Z(\theta_n)\}/\{b_1 \cdot Z(\theta_1)+b_2 \cdot Z(\theta_2)+ \ldots +b_n \cdot Z(\theta_n)\}$$

and, $$B=B'_x+B'_y+B'_z.$$

13. The multi-angle colorimeter according to claim 11, wherein the optical parameters are spectral reflectances $Ref(\lambda\theta)$ in a plurality of wavelengths $\lambda$, and
when $$I'_1(\theta_1) \text{ to } I'_1(\theta_n) = Ref(\lambda_1\theta_1) \text{ to } Ref(\lambda_1\theta_n)$$

$$I'_2(\theta_1) \text{ to } I'_2(\theta_n) = Ref(\lambda_2\theta_1) \text{ to } Ref(\lambda_2\theta_n)$$

$$\ldots$$

$$I'_m(\theta_1) \text{ to } I'_m(\theta_n) = Ref(\lambda_m\theta_1) \text{ to } Ref(\lambda_m\theta_n)$$

where the plurality of wavelengths $\lambda$ are $\lambda_1, \lambda_2, \ldots \lambda_m$, $$B'_1 = \{a_1 \cdot Ref(\lambda_1\theta_1) + a_2 \cdot Ref(\lambda_1\theta_2) + \ldots + a_n \cdot Ref(\lambda_1\theta_n)\} / \{b_1 \cdot Ref(\lambda_1\theta_1) + b_2 \cdot Ref(\lambda_1\theta_2) + \ldots + b_n \cdot Ref(\lambda_1\theta_n)\}$$

$$B'_2 = \{a_1 \cdot Ref(\lambda_2\theta_1) + a_2 \cdot Ref(\lambda_2\theta_2) + \ldots + a_n \cdot Ref(\lambda_2\theta_n)\} / \{b_1 \cdot Ref(\lambda_2\theta_1) + b_2 \cdot Ref(\lambda_2\theta_2) + \ldots + b_n \cdot Ref(\lambda_2\theta_n)\}$$

$$\ldots$$

$$B'_m = \{a_1 \cdot Ref(\lambda_m\theta_1) + a_2 \cdot Ref(\lambda_m\theta_2) + \ldots + a_n \cdot Ref(\lambda_m\theta_n)\} / \{b_1 \cdot Ref(\lambda_m\theta_1) + b_2 \cdot Ref(\lambda_m\theta_2) + \ldots + b_n \cdot Ref(\lambda_m\theta_n)\},$$

and $$B = B'_1 + B'_2 + \ldots + B'_m.$$

14. The multi-angle colorimeter according to claim 11, wherein
when the specular reflection direction is 0° on a plane including an incident direction and a specular reflection direction of a principal light beam of the light emitted from the light emitter with respect to the object, and an angle direction inclined from the specular reflection direction toward the incident direction is defined as a positive direction,
at least one of angles corresponding to the optical parameters multiplied with a positive weighting coefficient of the weighting coefficient $a_1$ to $a_n$ is an angle in a range from −15° to +45° with respect to the specular reflection direction.

15. The multi-angle colorimeter according to claim 11, wherein
when the specular reflection direction is 0° on a plane including an incident direction and a specular reflection direction of a principal light beam of the light emitted from the light emitter with respect to the object, and an angle direction inclined from the specular reflection direction toward the incident direction is defined as a positive direction,
at least one of angles corresponding to the optical parameters multiplied with a negative weighting coefficient of the weighting coefficient $a_1$ to $a_n$ is an angle in a range from −15° to +45° with respect to the specular reflection direction.

16. The multi-angle colorimeter according to claim 11, wherein
each of the weighting coefficients $b_1$ to $b_n$ is 1.

17. The multi-angle colorimeter according to claim 11, further comprising
a display that displays the index B or the summed value, which is calculated by the hardware processor.

* * * * *